US012725434B2

(12) United States Patent
Ryu et al.

(10) Patent No.: US 12,725,434 B2
(45) Date of Patent: Sep. 1, 2026

(54) METHOD AND APPARATUS FOR ANALYZING PATHOLOGICAL SLIDE IMAGES

(71) Applicant: Lunit Inc., Seoul (KR)

(72) Inventors: Jeongun Ryu, Seoul (KR); Mohammad Mostafavi, Seoul (KR); Biagio Brattoli, Seoul (KR); Chang Ho Ahn, Seoul (KR); Yoonji Lee, Seoul (KR); Taebum Lee, Seoul (KR); Sukjun Kim, Seoul (KR); Woochan Hwang, Seoul (KR)

(73) Assignee: Lunit Inc., Seoul (KR)

( * ) Notice: Subject to any disclaimer, the term of this patent is extended or adjusted under 35 U.S.C. 154(b) by 0 days.

(21) Appl. No.: 19/044,990

(22) Filed: Feb. 4, 2025

(65) Prior Publication Data

US 2025/0252760 A1 Aug. 7, 2025

(30) Foreign Application Priority Data

Feb. 7, 2024 (KR) ........................ 10-2024-0018904
Oct. 2, 2024 (KR) ........................ 10-2024-0133931
Dec. 20, 2024 (KR) ........................ 10-2024-0193383

(51) Int. Cl.
*G06V 20/69* (2022.01)
*G06T 7/00* (2017.01)
(Continued)

(52) U.S. Cl.
CPC .......... *G06V 20/695* (2022.01); *G06T 7/0012* (2013.01); *G06T 7/11* (2017.01);
(Continued)

(58) Field of Classification Search
CPC ...... G06V 20/695; G06V 10/28; G06V 10/82; G06V 10/86; G06V 20/698;
(Continued)

(56) References Cited

U.S. PATENT DOCUMENTS 10,818,101 B2 * 10/2020 Gallop .................... G06T 15/08
2015/0055844 A1 * 2/2015 Molin .................. G06T 3/4053
382/131
(Continued)

FOREIGN PATENT DOCUMENTS

CN 114235539 * 3/2022
EP 3 108 446 B1 3/2019
(Continued)

OTHER PUBLICATIONS

Machine translation for CN 114235539 (Year: 2022).*
(Continued)

*Primary Examiner* — Qian Yang
(74) *Attorney, Agent, or Firm* — Sughrue Mion, PLLC

(57) ABSTRACT

A computing apparatus includes a memory storing at least one program and a processor configured to perform at least one operation by executing the at least one program, wherein the processor is further configured to analyze a pathological slide image to classify at least one of cells and tissues included in the pathological slide image into at least one type, segment the pathological slide image into subpatches on the basis of a result of the classification, and analyze the subpatches to output information regarding components of a cell included in each of the subpatches.

15 Claims, 21 Drawing Sheets

(51) Int. Cl.

*G06T 7/11* (2017.01)
*G06V 10/28* (2022.01)
*G06V 10/82* (2022.01)
*G06V 10/86* (2022.01)

(52) U.S. Cl.

CPC .............. *G06V 10/28* (2022.01); *G06V 10/82* (2022.01); *G06V 10/86* (2022.01); *G06V 20/698* (2022.01); *G06T 2207/10024* (2013.01); *G06T 2207/20021* (2013.01); *G06T 2207/20072* (2013.01); *G06T 2207/20084* (2013.01); *G06T 2207/20092* (2013.01); *G06T 2207/30024* (2013.01); *G06V 2201/03* (2022.01)

(58) Field of Classification Search

CPC ..... G06V 2201/03; G06T 7/0012; G06T 7/11; G06T 2207/10024; G06T 2207/20021; G06T 2207/20072; G06T 2207/20084; G06T 2207/20092; G06T 2207/30024

See application file for complete search history.

(56) References Cited

U.S. PATENT DOCUMENTS

2021/0233238 A1 7/2021 Yip et al.
2021/0279866 A1* 9/2021 Svekolkin ............... G06F 18/22
2022/0351379 A1 11/2022 Lorsakul et al.
2022/0375606 A1* 11/2022 Glass .................... G06T 7/0012
2024/0252105 A1* 8/2024 Yoshikawa .............. A61B 6/51

FOREIGN PATENT DOCUMENTS

JP 2022-546600 * 11/2022
WO 2007/024264 A2 3/2007
WO WO 2023/175483 * 9/2023

OTHER PUBLICATIONS

Screenshot for PowerPoint operation (Year: 2021).*
Machines translation for JP 2022-546600 (Year: 2022).*
Extended European Search Report dated Jun. 11, 2025 in Application No. 25155774.0.

* cited by examiner

METHOD AND APPARATUS FOR ANALYZING PATHOLOGICAL SLIDE IMAGES

CROSS-REFERENCE TO RELATED APPLICATION

This application is based on and claims priority under 35 USC § 119 to Korean Patent Application Nos. 10-2024-0018904, filed on Feb. 7, 2024, 10-2024-0133931, filed on Oct. 2, 2024, and 10-2024-0193383 filed on Dec. 20, 2024 in the Korean Intellectual Property Office, the disclosures of which are incorporated by reference herein in their entireties.

BACKGROUND

1. Field

The disclosure relates to a method and apparatus for analyzing a pathological slide image.

2. Description of the Related Art

The field of digital pathology is a field that acquires histological information regarding corresponding patients or predicts prognosis of the patients by using whole slide images generated by scanning pathological slide images.

Recently, technologies for predicting medical information regarding subjects by analyzing pathological slide images through machine learning models have been developed. However, according to the existing technology, only some of various objects expressed in pathological slide images may be identified, and thus, comprehensively analyzing the pathological slide images is not easy.

SUMMARY

Provided are a method and apparatus for analyzing a pathological slide image, which enable accurate identification and analysis of objects and detailed components expressed in the pathological slide image. Provided is a computer-readable recording medium having recorded thereon a program for causing a computer to execute the method described above. The technical problems to be solved are not limited to the technical problems described above, and other technical challenges may be present.

Additional aspects will be set forth in part in the description which follows and, in part, will be apparent from the description, or may be learned by practice of the presented embodiments of the disclosure.

According to an aspect, a computing apparatus includes a memory storing at least one program and a processor configured to perform at least one operation by executing the at least one program, wherein the processor is further configured to analyze a pathological slide image to classify at least one of cells and tissues included in the pathological slide image into at least one type, segment the pathological slide image into subpatches on the basis of a result of the classification, and analyze the subpatches to output information regarding components of a cell included in each of the subpatches.

According to another aspect, a method of analyzing a pathological slide image includes analyzing the pathological slide image to classify at least one of cells and tissues included in the pathological slide image into at least one type, segmenting the pathological slide image into subpatches on the basis of a result of the classification, and outputting information regarding components of a cell included in each of the subpatches by analyzing the subpatches.

According to another aspect, a computer-readable recording medium includes a recording medium having recorded thereon a program for causing a computer to execute the method described above.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
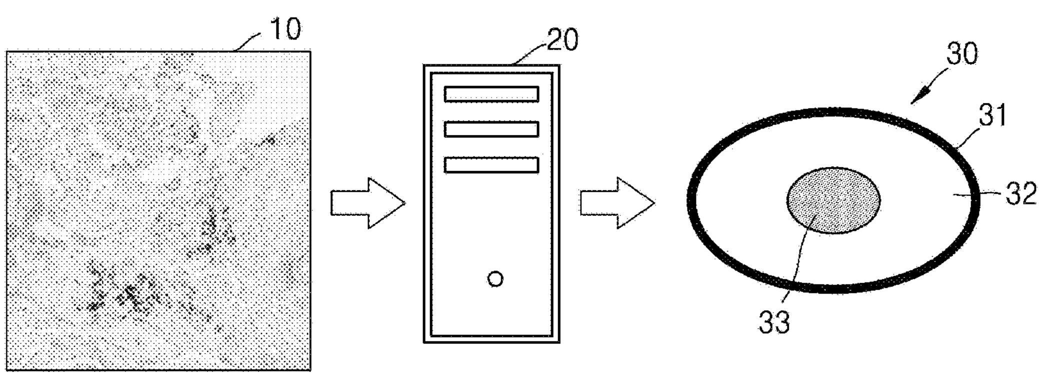
FIG. 1 is a view illustrating an example of analyzing a pathological slide image, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term “and/or” includes any and all combinations of one or more of the associated listed items. Expressions such as “at least one of,” when preceding a list of elements, modify the entire list of elements and do not modify the individual elements of the list.

Although the terms used in embodiments have selected general terms currently widely used as possible, these may vary depending on the intention of an engineer in the field or precedent, the emergence of new technologies, and the like. In addition, in certain cases, there are terms arbitrarily selected by the applicant, and in this case, the meanings thereof will be described in detail in the corresponding description. Therefore, the terms used herein should be defined based on the meanings of the terms and the overall content of the description, rather than simply the names of the terms.

Throughout the description, when a part is referred to as “including” a component, this means that it may further include other components, rather than excluding other components, unless otherwise stated. In addition, the terms such as “unit” and “module” in the description refer to units that process at least one function or operation, which may be implemented as hardware or software or a combination of hardware and software.

Also, although the terms, ‘first’, ‘second’, etc. may be used herein to describe various elements, these elements should not be limited by these terms. The terms may be used to distinguish one component from another.

Hereinafter, an “object” may refer to a protein, cell, tissue, structure, or the like included in a pathological slide image (or expressed in the pathological slide image).

Hereinafter, the “pathological slide image” may refer to an image acquired by scanning a pathological slide. Here, the pathological slide may be produced by arranging, on a glass slide, a slice obtained by cutting a tissue block collected from the human body in the form of a thin layer. For example, the pathological slide may be produced by fixing and staining the slice through a series of chemical treatments.

The pathological slide image may refer to a whole slide image (WSI) including a high-resolution image of the whole pathological slide, and may also refer to a portion of the whole slide image (e.g., one or more patches or tiles). For example, the pathological slide image may be a digital image scanned via a scanning apparatus (e.g., a digital scanner or the like).

The pathological slide image may be segmented into a tissue area in which a tissue collected from the human body is located and a background area, and information regarding a particular protein, cell, tissue and/or structure may be acquired from the tissue area.

Histological information may be applied (e.g., tagged) to one or more patches included in the pathological slide image through an annotation operation.

Hereinafter, “medical information” may refer to any medically meaningful information that may be extracted from a medical image (e.g., a pathological slide image). For example, the medical information may include at least one of information regarding an expression on the pathological slide image, an immune phenotype, a genotype, a biomarker score, a tumor purity, information regarding RNA, information regarding tumor microenvironment, a treatment method of a cancer expressed in the pathological slide image, survival information regarding a patient, and a treatment result.

In addition, the medical information may include the area, location, and size of a particular tissue (e.g., a cancer tissue, a cancer stroma tissue, or the like) and/or a particular cell (e.g., a tumor cell, a lymphocyte cell, a macrophage cell, an endothelial cell, a fibroblast cell, or the like) within the medical image, information regarding the diagnosis of cancer, information associated with the likelihood of a subject developing cancer, and/or medical conclusions associated with cancer treatment, but is not limited thereto.

In addition, the medical information may include quantified figures obtained from the medical image, as well as information obtained by visualizing figures, predictive information according to the figures, image information, statistical information, and the like. For example, the medical information may be provided to a user terminal or output through a display apparatus.

Hereinafter, an operation in which a processor displays (or outputs by overlaying) an image may include an operation in which the processor controls the display apparatus so that the image is output. Here, the display apparatus may be the same as an apparatus in which the processor is embedded, or may be an apparatus independent from the apparatus in which the processor is embedded.

Hereinafter, embodiments will be described in detail with reference to the accompanying drawings. However, the embodiments may be implemented in various different forms and are not limited to the examples described herein.

FIG. 1 is a view illustrating an example of analyzing a pathological slide image, according to an embodiment.

Referring to FIG. 1, a computing apparatus 20 may analyze a pathological slide image 10 to segment an object 30 (e.g., a cell 30) from the pathological slide image 10. For example, the computing apparatus 20 may segment components 31, 32, and 33 (e.g., a cell membrane 31, a cytoplasm 32, and a cell nucleus 33) included in the object 30 from the pathological slide image 10. Assuming that the object 30 is a cell, the computing apparatus 20 may identify and segment the cell membrane 31, the cytoplasm 32, and the cell nucleus 33 from the pathological slide image 10.

For example, the computing apparatus 20 may be a user terminal or a server.

The user terminal may be an electronic apparatus that is provided with a display apparatus and a device (e.g., a keyboard, a mouse, or the like) for receiving a user input and includes a memory and a processor. In addition, the display apparatus may also be implemented as a touch screen to perform a function of receiving a user input. For example, the user terminal may correspond to a notebook PC, a desktop PC, a laptop, a tablet computer, a smartphone, or the like, but is not limited thereto.

The server may be an apparatus that communicates with an external device (e.g., the user terminal or the like). For example, the server may be an apparatus that stores various types of data, including a pathological slide image, a bitmap image corresponding to the pathological slide image, information generated by analysis of the pathological slide image (e.g., information regarding at least one object expressed in the pathological slide image, information regarding at least one biomarker expression, medical information related to the pathological slide image, information regarding the degree of activation of immune cells of a patient, or the like), and information regarding a machine learning model used to analyze the pathological slide image. Alternatively, the server may be an apparatus that includes a memory and a processor and has a computational ability. For example, the server may also be a cloud server, but is not limited thereto.

The computing apparatus 20 may identify biological factors (e.g., cancer cells, immune cells, cancer areas, and the like) expressed in the pathological slide image 10 by analyzing the pathological slide image 10. The biological factors may be used for a histological diagnosis of a disease, prediction of a disease prognosis, a determination of treatment direction for the disease, and the like.

Meanwhile, according to the related art, all components of a cell may not be easily segmented from a pathological slide image. In other words, according to the related art, a machine learning model, which is trained to identify a cell nucleus in a pathological slide image, may not segment a cell membrane or cytoplasm. In contrast, a machine learning model, which is trained to identify a cell membrane in the pathological slide image, may not segment a cell nucleus or cytoplasm. Therefore, components of a cell may not be individually analyzed. In addition, according to the related art, quantification of a staining intensity of the pathological slide image may not also be easily implemented. In other words, according to the related art, intervention of an expert may be needed to quantify the staining intensity of the pathological slide image. For example, a user needs to manually define a color channel of the pathological slide image.

In other words, according to the related art, classes of cells on the pathological slide image may be annotated by the expert as positive or negative, and a machine learning model may be trained by using annotated data. In addition, the trained machine learning model may predict each cell class of the pathological slide image as positive or negative.

Alternatively, according to the related art, a staining intensity of a cell may be segmented into up to four levels (e.g., levels 0 to 3) and annotated by the expert, and the machine learning model may learn the same to predict the staining intensity of the cell into four levels. However, according to the disclosure, a staining intensity of a cell may be quantified as a continuous value from 0 to 100. In other words, by expressing the staining intensity as a value between 0 and 100, even a subtle change in staining may be numerically expressed, and thus, the computing apparatus 20 may provide the user with information that is more precisely and clearly predicted with respect to the staining intensity of the cell.

A great number of cells may be expressed in the pathological slide image. Therefore, in the case where the result of segmenting a cell from the pathological slide image is inaccurate, the accuracy of analysis of the pathological slide image may be lowered.

The computing apparatus 20 according to an embodiment may identify and segment all components included in the object 30 by analyzing the pathological slide image 10. For example, the computing apparatus 20 may accurately segment not only the cell nucleus 33 of the cell 30, but also the cell membrane 31 and the cytoplasm 32 from the pathological slide image 10. In addition, the computing apparatus 20 may calculate continuous values of staining intensities of the components 31, 32, and 33 constituting the cell 30.

For example, the computing apparatus 20 may generate and output various types of information regarding a tissue and a cell appearing in the pathological slide image 10 by analyzing the pathological slide image 10 by using at least one machine learning model. In particular, the computing apparatus 20 may also generate not only shapes of the components 31, 32, and 33 of the cell 30, but also scores corresponding to the staining intensities of the components 31, 32, and 33 and/or classes corresponding to levels of staining. In addition, the computing apparatus 20 may control the display apparatus so that information regarding the pathological slide image 10 is displayed.

Therefore, according to the computing apparatus 20, a high-performance cell segmentation algorithm (i.e., cell nucleus segmentation, cytoplasm segmentation, or cell membrane segmentation) may be implemented. In addition, the result of analyzing the pathological slide image 10 in a multilateral manner may be output. Therefore, the user may perform a follow-up procedure such as medical treatment by using a desired type of output value from among output values included in the result of the analysis.

In addition, the computing apparatus 20 may quantitatively analyze a tissue and cell in the pathological slide image 10, and thus, the computing apparatus 20 or a program executed on the computing apparatus 20 may be a general-purpose analysis tool of the pathological slide image 10.

In addition, the computing apparatus 20 may provide a screen on which the user may intuitively check information regarding staining intensities of components of each of cells included in the pathological slide image 10 and/or information regarding levels of staining.

Hereinafter, an example in which the computing apparatus 20 analyzes a pathological slide image is described with reference to FIGS. 2A to 18.

As described above, the computing apparatus 20 may be a user terminal or a server. Accordingly, operations performed by the computing apparatus 20 below may be performed by the user terminal or the server. Alternatively, some of the operations performed by the computing apparatus 20 below may be performed by the user terminal, and the rest may be performed by the server.

Hereinafter, examples of the user terminal and the server are described with reference to FIGS. 2A and 2B.

Figure 2A:
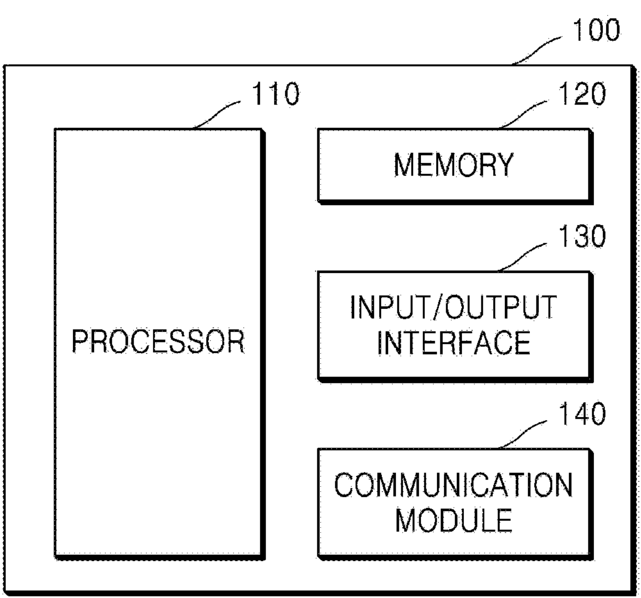
FIG. 2A is a block diagram illustrating an example of a user terminal according to an embodiment.

FIG. 2A is a block diagram illustrating an example of a user terminal according to an embodiment.

Referring to FIG. 2A, a user terminal 100 may include a processor 110, a memory 120, an input/output interface 130, and a communication module 140. For convenience of description, FIG. 2A illustrates only components related to the disclosure. Accordingly, the user terminal 100 may further include other general-purpose components in addition to the components illustrated in FIG. 2A. In addition, it is obvious to those skilled in the art related to the disclosure that the processor 110, the memory 120, the input/output interface 130, and the communication module 140 illustrated in FIG. 2A may also be implemented as independent devices.

The processor 110 may process commands of a computer program by performing basic arithmetic, logic, and input/output operations. Here, the commands may be provided from the memory 120 or an external apparatus (e.g., the server 20 or the like). In addition, the processor 110 may generally control operations of the other components included in the user terminal 100.

The processor 110 may analyze the pathological slide image 10 to classify at least one of cells and tissues included in the pathological slide image 10 into at least one type. For example, the processor 110 may analyze the pathological slide image 10 by using a machine learning model.

For example, the processor 110 may classify the cells included in the pathological slide image 10 into a tumor cell and other cells. In addition, the processor 110 may classify the tissues included in the pathological slide image 10 into a cancer area and other areas. However, the example in which the processor 110 classifies cells and tissues is not limited to the example described above, and the processor 110 may classify cells and tissues into various types. For example, the processor 110 may classify the cells included in the pathological slide image 10 into at least one of a tumor cell, lymphocyte, macrophage, fibroblast, and an endothelial cell. Alternatively, the processor 110 may classify the tissues included in the pathological slide image 10 into at least one of a cancer area, cancer stroma, necrosis, tertiary lymphoid structures, and treatment-induced fibrosis.

Here, the pathological slide image 10 may be a whole slide image for a whole pathological slide or any one of patches into which the whole slide image is segmented.

The processor 110 may segment the pathological slide image 10 into subpatches on the basis of the result of the classification. For example, a size of a subpatch may be determined so that one subpatch includes one cell, but is not limited thereto.

The processor 110 may analyzes the subpatches and output information regarding components of a cell included in each of the subpatches. For example, the processor 110 may analyze the subpatches by using a machine learning model to identify the components 31, 32, and 33 of the cell 30 in each of the subpatches. Here, the components of the cell may include the cell membrane 31, the cytoplasm 32, and the cell nucleus 33.

The processor 110 may output, by using the machine learning model, a first index for at least one of the components 31, 32, and 33 on the basis of information regarding the subpatches and the components 31, 32, and 33. For example, the first index may include at least one of a first score corresponding to a staining intensity of the cell membrane 31, a second score corresponding to a staining intensity of the cytoplasm 32, and a third score corresponding to a staining intensity of the cell nucleus 33.

For example, the processor 110 may convert a format of a subpatch. In addition, the processor 110 may calculate a histogram of each of color channels, for each of the cell membrane 31, the cytoplasm 32, and the cell nucleus 33 included in the converted subpatch. Also, the processor 110 may calculate, by using the machine learning model, at least one of a first score, a second score, and a third score on the basis of a combination of the histograms of the color channels.

In addition, the processor 110 may analyze the subpatches and output a second index for any one of the components 31, 32, and 33, by using the machine learning model. For example, the second index may be a class corresponding to the level of staining of the cell membrane 31 of the cell 30. In the disclosure, the level of staining may be information that may indicate how evenly staining is done within an area of the cell membrane 31, whether or not staining is done with being limited to a particular area, or the like. Here, the class may be any one of class 0 (negative or unstained), class 1 (partial staining), and class 2 (complete staining), but is not limited thereto.

The processor 110 may display at least one of a visualization result of the first index and a visualization result of the second index with respect to at least one of the components 31, 32, and 33 of each of the cells included in the pathological slide image 10. Here, the processor 110 displaying may include the processor 110 controlling an operation of a display apparatus.

The processor 110 may be implemented as an array of a plurality of logical gates, or may be implemented as a combination of a general-purpose microprocessor and a memory that stores a program executable by the microprocessor. For example, the processor 110 may include a general-purpose processor, a central processing unit (CPU), a microprocessor, a digital signal processor (DSP), a controller, a microcontroller, a state machine, or the like. In some environments, the processor 110 may also include an application-specific integrated circuit (ASIC), a programmable logic device (PLD), a field programmable gate array (FPGA), or the like. For example, the processor 110 may refer to a combination of processing devices, such as a combination of a digital signal processor (DSP) and a microprocessor, a combination of a plurality of microprocessors, a combination of one or more microprocessors combined with a digital signal processor (DSP) core, or any other combination of such components.

The memory 120 may include any non-transitory computer-readable recording medium. As an example, the memory 120 may include a permanent mass storage device such as random access memory (RAM), read only memory (ROM), a disk drive, a solid state drive (SSD), or flash memory. As another example, the permanent mass storage device such as ROM, an SSD, flash memory, or a disk drive may be a separate permanent storage device that is distinguished from a memory. In addition, the memory 120 may store an operating system (OS) and at least one program code (e.g., a code for the processor 110 to perform operations described below with reference to FIGS. 3 to 19).

Software components described above may be loaded from a computer-readable recording medium that is separate from the memory 120. The separate computer-readable recording medium may be a recording medium that may be directly connected to the user terminal 100 and may include, for example, a computer-readable recording medium such as a floppy drive, a disk, a tape, a DVD/CD-ROM drive, or a memory card. Alternatively, the software components may also be loaded into the memory 120 through the communication module 140 rather than the computer-readable recording medium. For example, the at least one program may be loaded into the memory 120 on the basis of a computer program that is installed by files provided through the communication module 140 by developers or a file distribution system that distributes installation files of applications (e.g., a computer program or the like for the processor 110 to perform operations described below with reference to FIGS. 3 to 19).

The input/output interface 130 may be a unit for interfacing with a device (e.g., a keyboard, a mouse, or the like) for an input or output, which may be connected to the user terminal 100 or may be included in the user terminal 100. Although FIG. 2A illustrates the input/output interface 130 as a component configured separately from the processor 110, but the input/output interface 130 is not limited thereto and may also be configured to be included in the processor 110.

The communication module 140 may provide a component or function for the server 200 and the user terminal 100 to communicate with each other through a network. In addition, the communication module 140 may provide a component or function for the user terminal 100 to communicate with another external device. For example, a control signal, a command, data, and the like, which are provided under control of the processor 110, may be transmitted to the server 200 and/or an external device through the communication module 140 and the network.

Meanwhile, although not illustrated in FIG. 2A, the user terminal 100 may further include a display device. Alternatively, the user terminal 100 may be connected to an independent display device through a wired or wireless communication method to transmit and receive data to and from each other. For example, a pathological slide image, analysis information regarding the pathological slide image, medical information, additional information based on the medical information, and the like may be provided to a user through the display device.

Figure 2B:
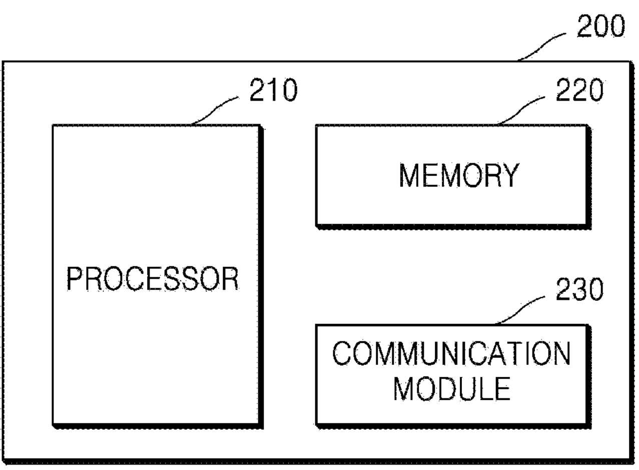
FIG. 2B is a block diagram illustrating an example of a server according to an embodiment.

FIG. 2B is a block diagram illustrating an example of a server according to an embodiment.

Referring to FIG. 2B, a server 200 may include a processor 210, a memory 220, and a communication module 230. For convenience of description, FIG. 2B illustrates only components related to the disclosure. Accordingly, the server 200 may further include other general-purpose components, in addition to the components illustrated in FIG. 2B. In addition, it is obvious to those skilled in the art related to the disclosure that the processor 210, the memory 220, and the communication module 230 illustrated in FIG. 2B may be implemented as independent devices.

The processor 210 may acquire a pathological slide image from at least one of the memory 220, the user terminal 100, and another external device. The processor 210 may classify cells and tissues included in the pathological slide image into at least one type, segment the pathological slide image into subpatches on the basis of the result of the classification, or analyze the subpatches to output information regarding components of a cell. Alternatively, the processor 210 may transmit the information regarding the components to the user terminal 100.

In addition, the processor 210 may display at least one of a visualization result of a first index and a visualization result of a second index. Here, the processor 210 displaying may include the processor 210 controlling an operation of a display apparatus.

In other words, at least one of the operations of the processor 110 described above with reference to FIG. 2A may be performed by the processor 210. Here, the user terminal 100 may output, through the display apparatus, information transmitted from the server 200.

Meanwhile, the implementation example of the processor 210 may be the same as the implementation example of the processor 110 described above with reference to FIG. 2A, and thus, a detailed description thereof is omitted.

The memory 220 may store various types of data such as the pathological slide image and data generated according to the operation of the processor 210. In addition, the memory 220 may store an operating system (OS) and at least one program (e.g., a program or the like needed for the processor 210 to operate).

Meanwhile, the implementation example of the memory 220 may be the same as the implementation example of the memory 120 described above with reference to FIG. 2A, and thus, a detailed description thereof is omitted.

The communication module 230 may provide a component or function for the server 200 and the user terminal 100 to communicate with each other through a network. In addition, the communication module 230 may provide a component or function for the server 200 to communicate with another external device. For example, a control signal, a command, data, and the like, which are provided under control of the processor 210, may be transmitted to the user terminal 100 and/or an external device through the communication module 230 and the network.

Figure 3:
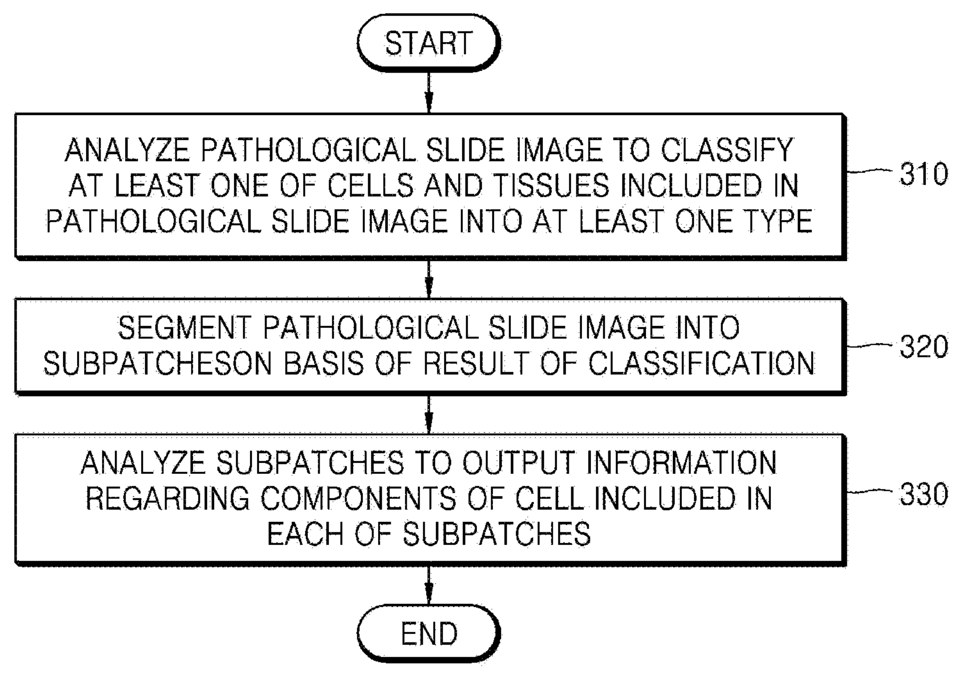
FIG. 3 is a flowchart illustrating an example of a method of analyzing a pathological slide image, according to an embodiment.

FIG. 3 is a flowchart illustrating an example of a method of analyzing a pathological slide image, according to an embodiment.

The method illustrated in FIG. 3 may include operations processed in time series by the computing apparatus 20 or the processors 110 and 210 illustrated in FIGS. 1 to 2B. Therefore, although the above description of the computing apparatus 20 or the processors 110 and 210 is omitted below, the description may also be applied to the method illustrated in FIG. 3.

In addition, at least one of operations performed by the processor 110 below may be processed by the processor 210.

In operation 310, the processor 110 may analyze the pathological slide image 10 to classify at least one of cells and tissues included in the pathological slide image 10 into at least one type.

The processor 110 may analyze the pathological slide image 10 and classify the cells or the tissues, by using a machine learning model. For example, a pathological slide image may be an immunohistochemistry (IHC)-stained image, but is not limited thereto. IHC staining may be, for example, a method of visualizing antibodies having peroxidase attached thereto through a 3,3'-diaminobenzidine (DAB) reaction, but is not limited thereto. In other words, generation of the pathological slide image is not limited to a type of staining of a particular antibody.

Hereinafter, the machine learning model may refer to a statistical learning algorithm implemented on the basis of a structure of a biological neural network, or a structure for executing the algorithm.

For example, the machine learning model may refer to a model that has a problem-solving ability by training nodes, which are artificial neurons forming a network through a combination of synapses as in a biological neural network, by repeatedly adjusting weights of the synapses to reduce an error between a correct output and inferred output corresponding to a particular input. For example, the machine learning model may include any probability model, neural network model, or the like used in an artificial intelligence learning method such as deep learning.

For example, the machine learning model may be implemented as a multilayer perceptron (MLP) including multilayer nodes and connections therebetween. The machine learning model according to the present embodiment may be implemented by using one of various types of artificial neural network model structures including MLP. For example, the machine learning model may include an input layer that receives an input signal or data from the outside, an output layer that outputs an output signal or data corresponding to the input data, and at least one hidden layer that is between the input layer and the output layer, receives a signal from the input layer, extracts features, and delivers the extracted features to the output layer. The output layer may receive a signal or data from the hidden layer and output the received signal or data to the outside.

Therefore, the machine learning model may be trained to receive one or more pathological slide images, and extract information regarding one or more objects (e.g., a cell, a tissue, a structure, and the like) included in the pathological slide images and/or expression information regarding biomarkers.

The pathological slide image may be a whole slide image, or may be any one of patches into which the whole slide image is segmented. For example, the processor 110 may classify cells and/or tissues by analyzing the whole slide image. Alternatively, the processor 110 may also classify the cells and/or the tissues by analyzing the patches. Hereinafter, the pathological slide image may refer to the whole slide image or a patch.

Hereinafter, an example in which the processor 110 classifies cells and/or tissues included in a pathological slide image is described with reference to FIG. 4.

Figure 4:
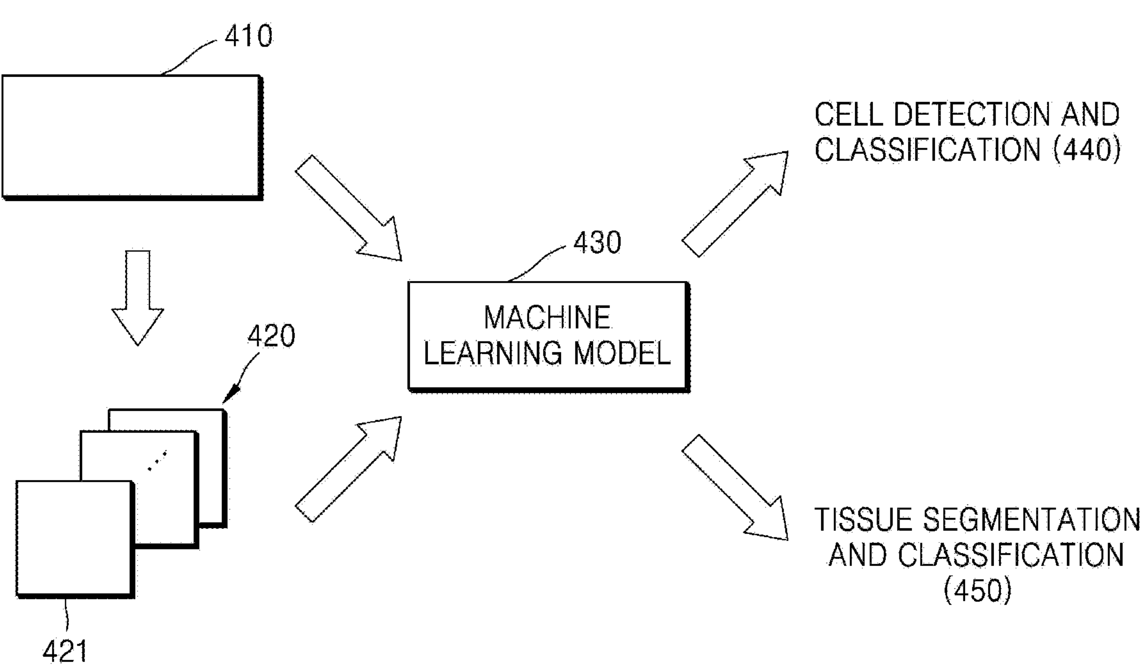
FIG. 4 is a view illustrating an example in which a processor classifies cells or tissues included in a pathological slide image, according to an embodiment.

FIG. 4 is a view illustrating an example in which a processor classifies cells or tissues included in a pathological slide image, according to an embodiment.

Referring to FIG. 4, the processor 110 may analyze a whole slide image 410 or patches 420 into which the whole slide image 410 is segmented, by using a machine learning model 430. For example, the processor 110 may generate the patches 420 by segmenting the whole slide image 410 into a certain size (e.g., 1216*1216 pixels). In addition, the processor 110 may analyze the patches 420.

Accordingly, the processor 110 may detect and classify 440 a cell included in a pathological slide image through the machine learning model 430. In addition, the processor 110 may detect and classify 450 a tissue included in the pathological slide image through the machine learning model 430.

Hereinafter, an example in which the processor 110 analyzes a patch 421 by using the machine learning model 430 is described. In the same manner as an analysis method below, the processor 110 may also analyze the whole slide image 410.

The processor 110 may perform the segmentation and classification 450 into a plurality of areas by analyzing the patch 421.

For example, the processor 110 may output a detection result in the form of layers representing tissues on the patch 421 by using the machine learning model 430. Here, the machine learning model 430 may be trained to detect, within the patches 420, areas corresponding to tissues within reference pathological slide images by using training data including a plurality of reference pathological slide images (or patches) and a plurality of pieces of reference label information.

In addition, the processor 110 may perform the classification 450 on a plurality of tissues expressed in the patch 421. For example, the processor 110 may classify the tissues of the patch 421 into a cancer area or other areas. Alternatively, the processor 110 may classify the tissues of the patch 421 into any one of a cancer area, a cancer stroma area, a necrosis area, and a background area.

However, the example in which the processor 110 classifies areas included in the patch 421 is not limited to the above example. In other words, the processor 110 may classify the areas included in the patch 421 into a plurality of categories according to various criteria, without being limited to the above-described areas (e.g., a cancer area, a cancer stroma area, a necrosis area, and a background area). For example, the areas included in the patch 421 may be classified into a plurality of categories according to preset criteria or criteria set by a user.

In addition, the processor 110 may perform the detection and classification 440 on a plurality of cells by analyzing the patch 421.

The processor 110 may analyze the patch 421, detect cells from the patch 421, and output a detection result in the form of layers representing the cells.

The processor 110 may output the detection result in the form of layers representing the cells on the patch 421, by using the machine learning model 430. Here, the machine learning model 430 may be trained to detect, within the patch 421, locations and types of cells within the reference pathological slide images by using the training data including the plurality of reference pathological slide images (or patches) and the plurality of pieces of reference label information.

In addition, the processor 110 may perform classification on a plurality of cells included in the patch 421. For example, the processor 110 may classify a plurality of cells into tumor cells or other cells. Alternatively, the processor 110 may classify the plurality of cells into at least one of a tumor cell, a lymphocytes cell, and other cells.

However, the example in which the processor 110 classifies the cells expressed in the patch 421 is not limited to the above example. In other words, without being limited to the above-described cells (i.e., a tumor cell, a lymphocytes cell, and other cells), the processor 110 may classify the cells expressed in the patch 421 into a plurality of categories according to various criteria. The cells of the patch 421 may be grouped into a plurality of categories according to preset criteria or criteria set by the user.

Referring back to FIG. 3, in operation 320, the processor 110 may segment the pathological slide image 10 into subpatches on the basis of the result of the classification.

The processor 110 may segment the pathological slide image 10 into the subpatches on the basis of the result of the classification in operation 310. For example, the processor 110 may generate the subpatches including a cancer cell from among the cells included in the pathological slide image 10.

For example, the processor 110 may segment the pathological slide image 10 by using central locations of the cells. Hereinafter, the example in which the processor 110 segments the pathological slide image 10 is described with reference to FIG. 5.

Figure 5:
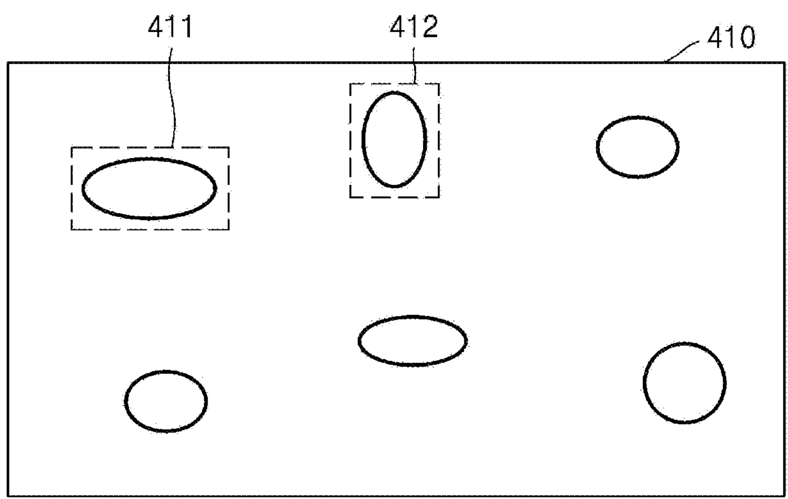
FIG. 5 is a view illustrating an example in which a processor generates subpatches, according to an embodiment.

FIG. 5 is a view illustrating an example in which a processor generates subpatches, according to an embodiment.

Referring to FIG. 5, the processor 110 may generate a plurality of subpatches 411 and 412 by segmenting a pathological slide image 410. For example, the subpatches 411 and 412 may be generated to include cancer cells. However, the subpatches are not limited thereto, and the processor 110 may generate the subpatches 411 and 412 on the basis of a particular type of cells (or all cells) from among cells included in the pathological slide image 410.

For example, the processor 110 may generate the subpatches 411 and 412 such that cells are located at centers of the subpatches 411 and 412. In addition, sizes of the subpatches 411 and 412 may be determined so that a single cell may be included in a single subpatch.

Here, the subpatches 411 and 412 may be generated in the same size. A size of a subpatch may be predefined through an average size of a cell at a predetermined zoom level and a pixel per micron (PPM) value. For example, the size of the subpatch may be 192*192 pixels, but is not limited thereto.

Referring back to FIG. 3, in operation 330, the processor 110 may output information regarding components of a cell included in each of the subpatches by analyzing the subpatches.

The processor 110 may analyze the subpatches and output the information regarding the components of the cell, by using the machine learning model. Hereinafter, an example in which the processor 110 outputs information regarding components of a cell is described with reference to FIG. 6.

Figure 6:
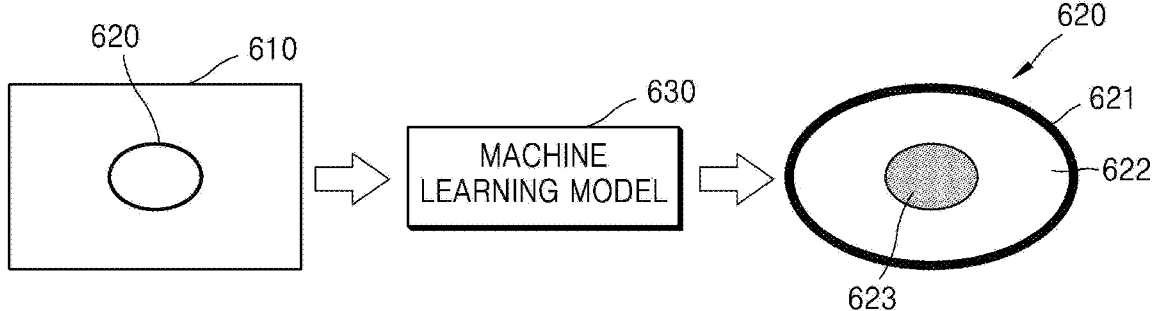
FIG. 6 is a view illustrating an example in which a processor outputs information regarding components of a cell, according to an embodiment.

FIG. 6 is a view illustrating an example in which the processor 110 outputs information regarding components of a cell, according to an embodiment.

Referring to FIG. 6, a subpatch 610 may include a cell 620. The processor 110 may identify components 621, 622, and 623 included in the cell 620 by analyzing the subpatch 610 by using a machine learning model 630. For example, the components 621, 622, and 623 may include a cell membrane 621, cytoplasm 622, and a cell nucleus 623.

As the components 621, 622, and 623 are identified in the subpatch 610, the processor 110 may output information such as locations and shapes of the components 621, 622, and 623.

For example, the machine learning model 630 may be a deep convolution network. In addition, the machine learning model 630 may be trained by fully-supervised learning using, as training data, reference pathological slide images (or patches) including manual annotations. However, a training method for the machine learning model 630 is not limited to the method described above. For example, the machine learning model 630 may also be trained by self-supervised learning using reference pathological slide images, which do not include annotations, as training data.

As described above with reference to FIGS. 1 to 6, the processor 110 may not only identify an object (e.g., the cell 30) from the pathological slide image 10, but also accurately identify components that constitute the object. In addition, as described below, the processor 110 may output a first index indicating staining intensities of the components and a second index indicating levels of staining of the components.

The processor 110 may output a first index for at least one of the components on the basis of information regarding subpatches and the components of the object (e.g., the cell 30). For example, the processor 110 may output the first index for at least one of the components by using a machine learning model.

For example, assuming that the object is the cell 30, the first index may include at least one of a first score corresponding to a staining intensity of a cell membrane, a second score corresponding to a staining intensity of cytoplasm, and a third score corresponding to a staining intensity of a cell nucleus. Hereinafter, an example in which the processor 110 outputs a first index is described with reference to FIG. 7.

Figure 7:
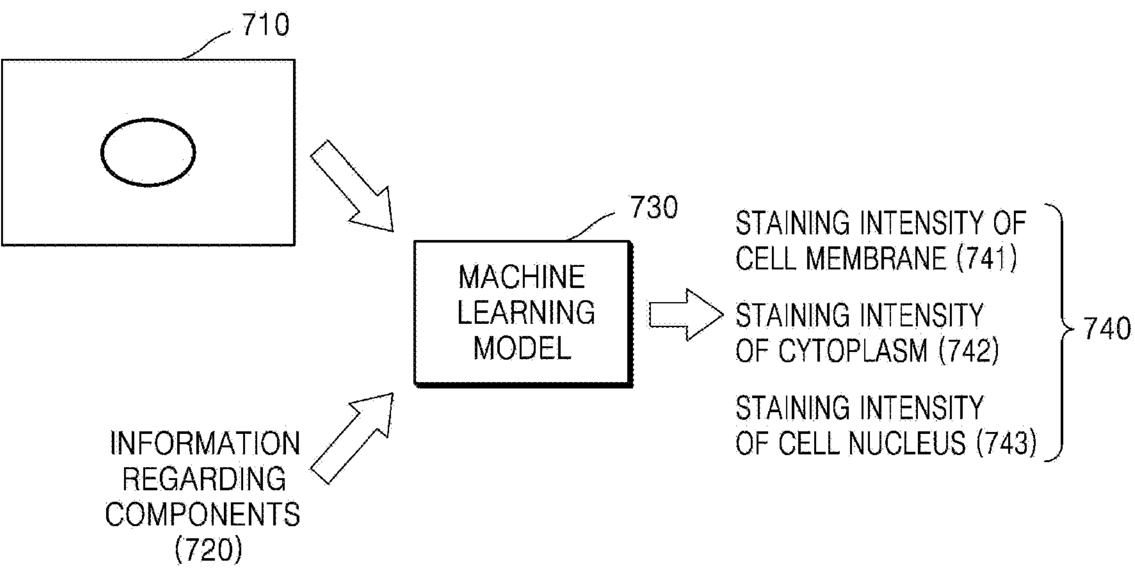
FIG. 7 is a view illustrating an example in which a processor outputs a first index, according to an embodiment.

FIG. 7 is a view illustrating an example in which a processor outputs a first index, according to an embodiment.

Referring to FIG. 7, the processor 110 may generate a first index 740 by using a subpatch 710 and information 720 regarding components of an object and output the first index 740. The first index 740 may include at least one of a first score corresponding to a staining intensity 741 of a cell membrane, a second score corresponding to a staining intensity 742 of cytoplasm, and a third score corresponding to a staining intensity 743 of a cell nucleus.

As described above with reference to FIG. 3, the processor 110 may generate the subpatch 710 and generate information 720 regarding components of an object (e.g., a cell). Accordingly, the processor 110 may generate the first index 740 from the subpatch 710 and the information 720 by using a machine learning model 730.

The processor 110 may convert a format of the subpatch 710. For example, the processor 110 may convert the format of the subpatch 710 from an RGB format to a hue saturation value (HSV) format.

In addition, the processor 110 may calculates histograms of respective color channels respectively for the cell membrane, the cytoplasm, and the cell nucleus included in the converted subpatch 710. Here, a combination of the calculated histograms may be used as an input into the machine learning model 730.

In addition, the processor 110 may calculate initial values of the first score, the second score, and the third score from the combination of the histograms by using the machine learning model 730. For example, the initial values of the first score, the second score, and the third score may be output as values between −0.20 and 1.20, respectively, but are not limited thereto.

In addition, the processor 110 may correct the initial values to calculate a final value of the first score, the second score, and the third score. For example, the processor 110 may correct the initial values by multiplying each of the initial values by 100, except for values less than 0 or more than 1 from among the initial values.

For example, the machine learning model 730 may be trained on the basis of manual annotations. The manual annotations may be made by an expert allocating classes of staining to the respective components of the cell (i.e., the cell membrane, the cytoplasm, and the cell nucleus). For example, the annotations may be made at any one of four classes (TC0, TC1+, TC2+, and TC3+). In addition, as an unlimited example, each class may correspond to a value linearly spaced between 0 and 1. For example, TC0 may be 0, TC1+ may be 0.33, TC2+ may be 0.66, and TC3+ may be 1.0. However, the number of classes and values corresponding to the respective classes are not limited to the above examples.

The processor 110 may output a second index for any one of the components of the object by analyzing the subpatches. For example, the processor 110 may output the second index for any one of the components by using a machine learning model.

For example, assuming that the object is the cell 30, the second index may include a class corresponding to the level of staining of the cell membrane. Hereinafter, an example in which the processor 110 outputs a second index is described with reference to FIG. 8.

Figure 8:
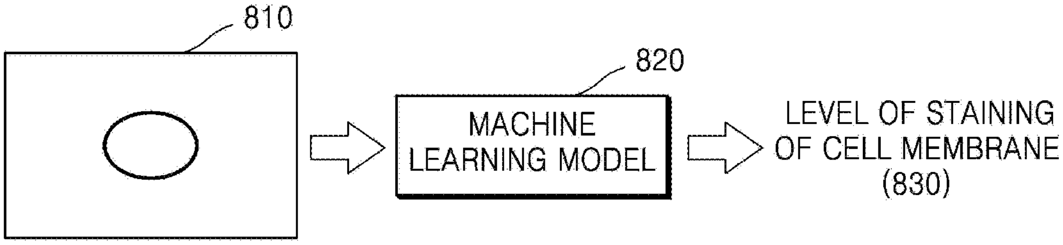
FIG. 8 is a view illustrating an example in which a processor outputs a second index, according to an embodiment.

FIG. 8 is a view illustrating an example in which a processor outputs a second index, according to an embodiment.

Referring to FIG. 8, the processor 110 may analyze a subpatch 810 to generate a second index and output the second index. The second index may include a class corresponding to a level of staining 830 of a cell membrane.

As described above with reference to FIG. 3, the processor 110 may generate the subpatch 810 and generate information regarding components of an object (e.g., a cell). Accordingly, the processor 110 may generate the second index from the subpatch 810 by using a machine learning model 820.

A machine learning model according to the related art may detect a cell from a pathological slide image, but may not detect components of a cell (i.e., a cell nucleus, cytoplasm, a cell membrane). However, the processor 110 according to an embodiment may detect a cell from a pathological slide image and identify a location, and completeness of staining of a cell membrane. Accordingly, the processor 110 may classify classes according to a level of staining of the cell membrane.

As described above with reference to operation 320, the processor 110 may infer a central location of each cell from the pathological slide image. Accordingly, the processor 110 may generate the subpatch 810 from the pathological slide image. In addition, the processor 110 may check the level of staining of the cell membrane by analyzing the subpatch 810 through the machine learning model 820.

For example, the machine learning model 820 may be a deep convolution network, but is not limited thereto. An input into the machine learning model 820 may be the subpatch 810, and an output from the machine learning model 820 may be a class corresponding to completeness of staining of the cell membrane (i.e., the level of staining 830).

For example, the class may be any one of three classes (i.e., class 0, class 1, and class 2). In detail, the class 0 may indicate that the cell membrane is negative or unstained, the class 1 may indicate that the cell membrane is partially stained, and the class 2 may indicate that the cell membrane is completely stained. However, the number of classes and a criterion for each class are not limited to the above examples.

As described above with reference to FIGS. 1 to 8, the processor 110 may not only identify components of an object (e.g., the cell 30) from a pathological slide image, but also check staining intensities and levels of staining of the components appearing in the pathological slide image. Therefore, a high-performance cell segmentation algorithm may be implemented.

In addition, the processor 110 may output a result of analyzing the pathological slide image in the multilateral manner. Accordingly, a user may perform a follow-up procedure, such as medical treatment, by using a desired type of an output value from among output values included in the result of the analysis.

In addition, the processor 110 may perform quantitative analysis of a tissue and a cell in the pathological slide image 10, and thus, the processor 110 or a program executed by the processor 110 may be a general-purpose analysis tool of the pathological slide image 10.

Hereinafter, examples in which the processor 110 displays a screen including various types of information are described with reference to FIGS. 9 to 17. Here, the processor 110 displaying may include the processor 110 controlling an operation of a display apparatus. Also, examples in which a report including the result of analyzing a pathological slide image is output by the processor 110 are described. In addition, examples in which information output by the processor 110 is used are described.

For example, the processor 110 may display at least one of a visualization result of a first index and a visualization result of a second index. In addition, the processor 110 may output the report including the result of analyzing the pathological slide image. Hereinafter, examples of a screen displayed and an example of outputting a report are described with reference to FIGS. 9 to 15.

Figure 9:
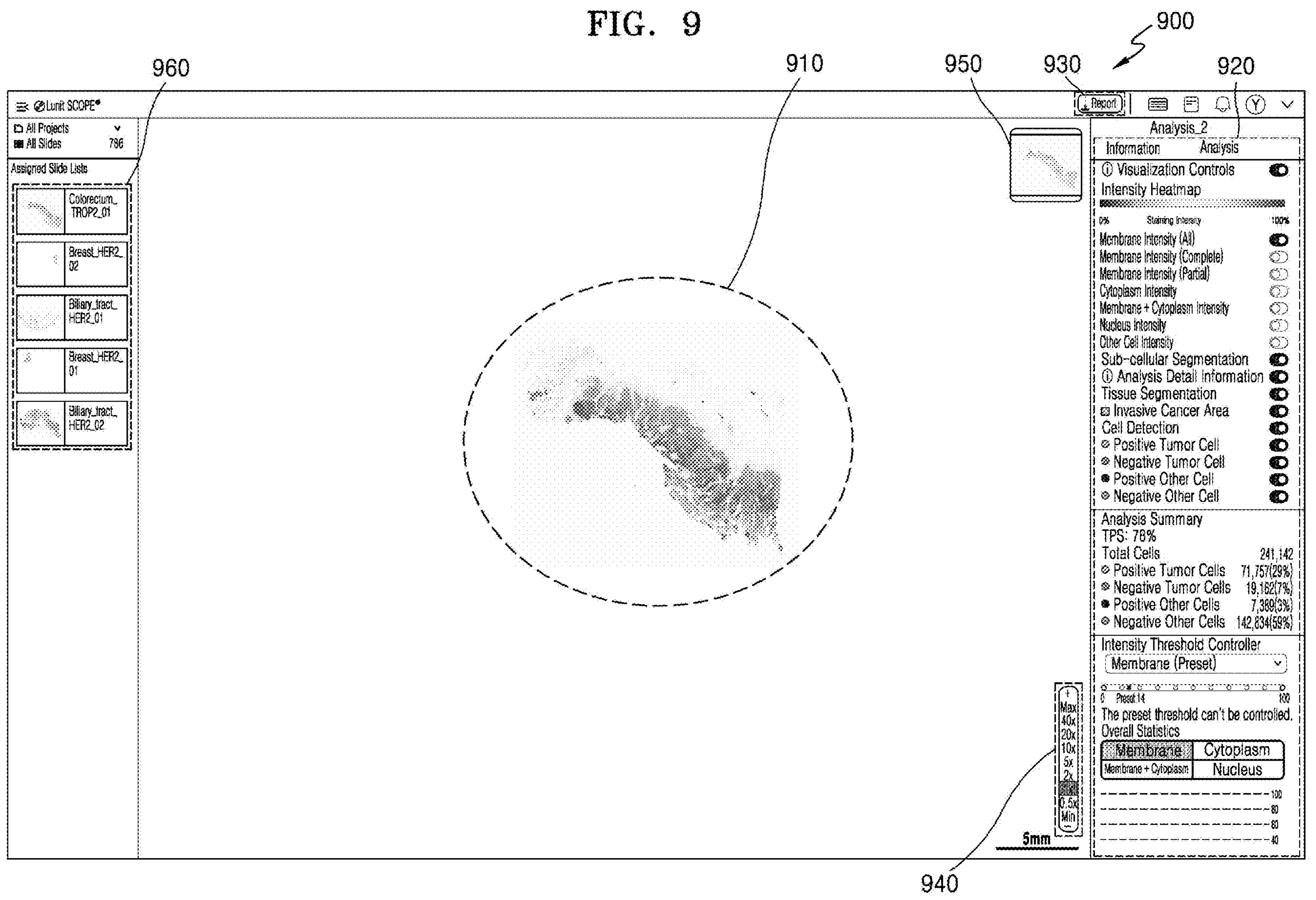
FIG. 9 is a view illustrating an example in which a heatmap is output, according to an embodiment.

FIG. 9 is a view illustrating an example in which a heatmap is output, according to an embodiment.

Referring to FIG. 9, the processor 110 may overlay and display a heatmap generated on the basis of at least one of a score corresponding to a first index, and a second index, on a screen 900 on which at least a portion of a pathological slide image is output. In other words, at least a portion of the pathological slide image may be output on the screen 900, and the heatmap may be overlaid on the pathological slide image.

The heatmap may be generated according to a condition set by a user. For example, the user may set an output condition of the heatmap through a control user interface (UI) 920 displayed in a partial area of the screen 900. Here, the output condition of the heatmap may be variously set according to the first index and the second index. An example in which the control UI 920 is configured is described below with reference to FIGS. 10 to 12.

For example, a color of the heatmap may be determined according to the highs and lows of a staining intensity of a component (e.g., a cell membrane, cytoplasm, a cell nucleus, a cell membrane corresponding to class 1 (partial staining), or a cell membrane corresponding to class 2 (complete staining) selected by the user. For example, the color of the heatmap may be expressed in red in the case where the first index for s staining intensity has the greatest value (e.g., 100%), expressed in yellow in the case where the first index has an intermediate value (e.g., 50%), or expressed in blue in the case where the first index has the smallest value (e.g., 0%). Accordingly, the user may intuitively check staining intensities of components included in the pathological slide image.

Meanwhile, a UI 940 for designating an enlargement magnification of the pathological slide image may be output on the screen 900. As the user adjusts the UI 940, the pathological slide image may be zoomed in or zoomed out at a corresponding magnification and output. For example, the heatmap may be output on the screen 900 until the heatmap reaches the maximum magnification displayed on the UI 940. In the case wherein the maximum magnification is reached, subcell information illustrated in FIGS. 13 and 14 may be output on the screen 900.

In addition, an indicator 930 in which a report including the result of analysis of the pathological slide image is output may be displayed on the screen 900. In the case where the user selects the indicator 930, the processor 110 may output the report. For example, the report may include at least one piece of information from among information regarding the components, information regarding the first index and the second index, configured MPP information, information regarding whether or not the pathological slide image passes a quality check (QC) test, information regarding an area of a cancer area, items (e.g., membrane, membrane+cytoplasm, and the like) selected by the user in relation to a threshold value of a staining intensity, a set unit (e.g., a value between 1 and 100) of a threshold value of a staining intensity selected by the user, a threshold value of a staining intensity that is preset, or set by the user, a tumor proportion score (TPS), a combined positive score (CPS), the number (or proportion) of positive tumor cells, the number (or proportion) of negative tumor cells, the number (or proportion) of positive other cells, the number (or proportion) of negative other cells, and link information connected to a visualizer (i.e., the screen 900 on which at least a portion of the pathological slide image is output), but is not limited thereto. In addition, the report may include various types of information described below with reference to FIGS. 16 and 17.

Also, a thumbnail image 950 of the pathological slide image may be output on the screen 900. Accordingly, the user may intuitively check, through the thumbnail image 950, a portion of the pathological slide image output on the current screen 900.

In addition, a list 960 of other pathological slide images, which may be checked by the user, may be output on the screen 900. In the case where the user selects one of pathological slide images included in the list 960, the heatmap may be overlaid and displayed on the selected image on the screen 900.

Figure 10:
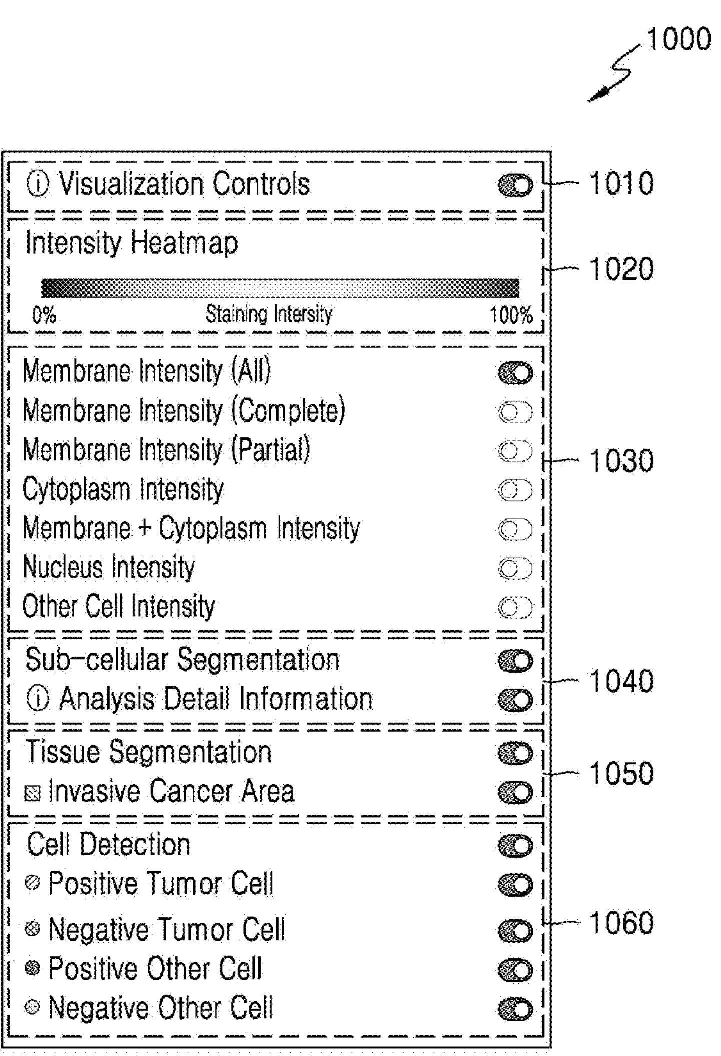
FIGS. 10 to 12 are views illustrating examples of a control UI according to an embodiment.
Figure 11:
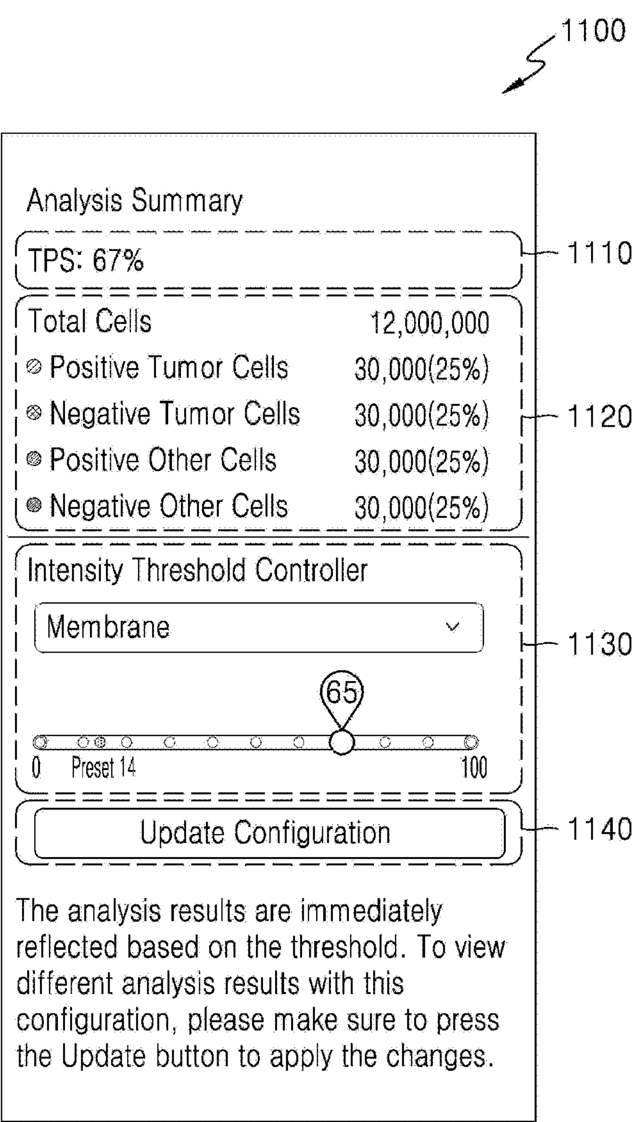
Figure 12:
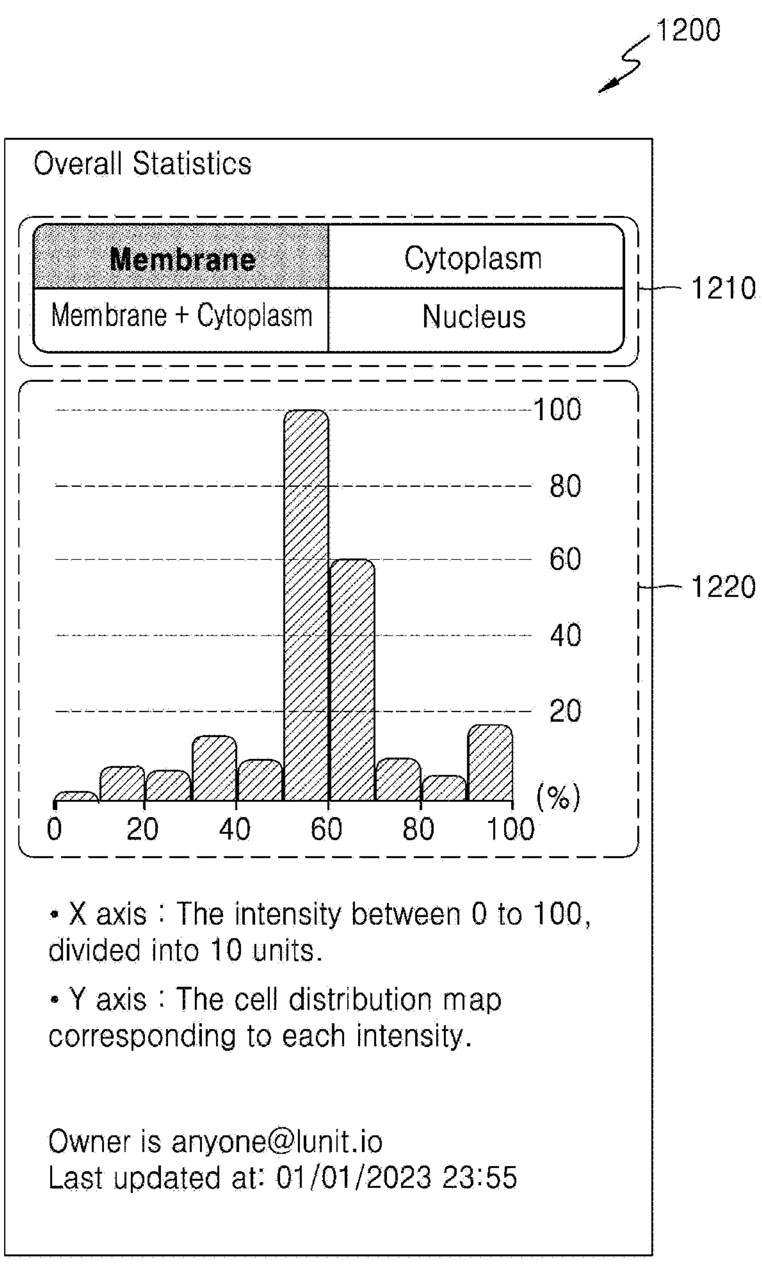

FIGS. 10 to 12 are views illustrating examples of a control UI according to an embodiment.

The examples illustrated in FIGS. 10 to 12 may be connected and output one screen. Alternatively, the examples illustrated in FIGS. 10 to 12 may be separated and output on different screens according to selection by a user.

Referring to FIG. 10, a control UI 1000 may include various conditions for setting information output on the screen. For example, as the user manipulates a UI 1010, only a pathological slide image may be output on the screen, or various analysis results such as a heatmap may be output together with the pathological slide image.

In addition, a color in which the heatmap is output according to a score corresponding to a first index (i.e., a score indicating a staining intensity) may be output in an area 1020. Accordingly, the user may intuitively check a score indicating a staining intensity of a component included in a corresponding area by comparing the color within the heatmap output on the screen with the UI 1010.

In addition, as the user manipulates a UI 1030, components to be output as a heatmap may be determined. For example, staining intensities of all components of a cell may be output as a heatmap. Alternatively, any one or a combination of two or more of a staining intensity of a cell membrane, a staining intensity of cytoplasm, and a staining intensity of a cell nucleus may be output as a heatmap.

Here, a heatmap may be selectively output according to a level of staining, even with respect to each component. For example, even in the case of cell membranes, only cell membranes corresponding to class 0 (negative or unstained) may be output as a heatmap, only cell membranes corresponding to class 1 (partial staining) may be output as a heatmap, or only cell membranes corresponding to class 2 (complete staining) may be output as a heatmap.

Figure 14:
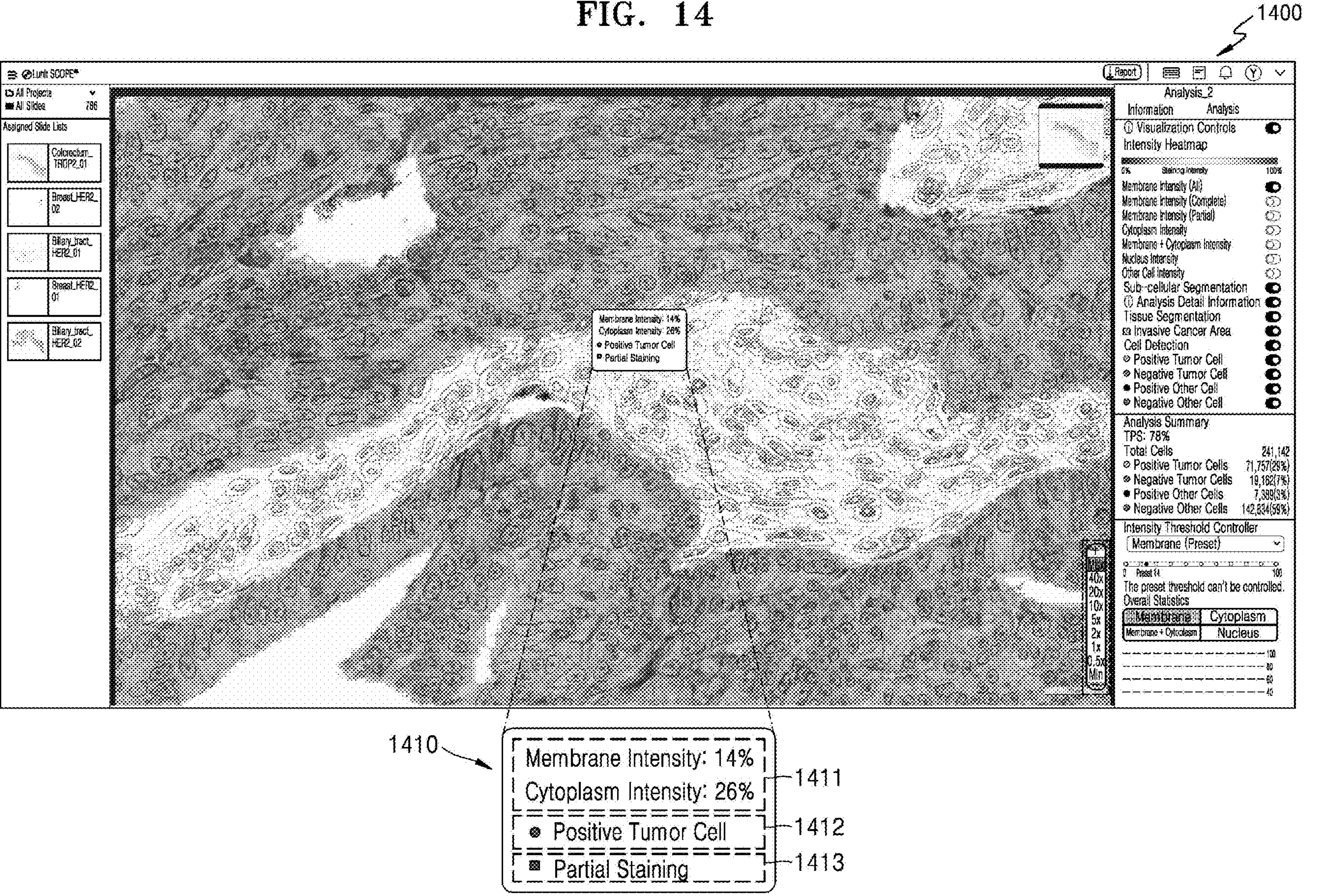

In addition, as the user manipulates a UI 1040, whether or not a window described below with reference to FIG. 14 is output on a screen may be determined.

In addition, as the user manipulates a UI 1050, areas may be distinguished and displayed in the pathological slide image output on the screen. For example, a particular area (e.g., a cancer area or the like) may be distinguished from other areas and displayed in the pathological slide image.

In addition, as the user manipulates a UI 1060, cells may be distinguished and displayed in the pathological slide image that is output on the screen. For example, the user may set so that a positive/negative tumor cell and positive/negative other cells are distinguished and displayed in the pathological slide image.

In an embodiment, in the case where an enlargement magnification set according to a user input is a preset magnification or more, the user may manipulate the UI 1060 to set so that a figure generated on the basis of a class corresponding to a second index is displayed at a central point of each of the cells on the screen. For example, a shape of the figure may be displayed differently according to a level of staining, and a color of the figure may be displayed differently according to a type of a detected cell.

Referring to FIG. 11, some of information obtained by analyzing a pathological slide may be output in control UI 1100. For example, a tumor proportion score (TPS) and/or a combined positive score (CPS) in the whole the pathological slide image or an area of interest of the pathological slide image may be output in an area 1110. In addition, statistics (e.g., the number (or proportion) of positive/negative tumor cells and the number (or proportion) of positive/negative other cells) according to types of cells in the whole pathological slide image or the area of interest may be output in an area 1120.

In addition, an area 1130 may include an object capable of adjusting a threshold value of a staining intensity. For example, the processor 110 may display an object (e.g., a slide bar) that adjusts a threshold value for determining, on the basis of a score corresponding to a first index, whether or not a cell membrane is stained. In addition, the processor 110 may update and display a visualization result of the first index, on the basis of a user input for adjusting the threshold value through the object.

For example, to adjust the threshold value, a user may select at least one component (e.g., a cell membrane or cell membrane+cytoplasm) from among components. In the case where the user selects the cell membrane and adjusts the threshold value by manipulating the slide bar, a staining intensity that distinguishes whether staining of the cell membrane is positive or negative in the pathological slide image may be updated with the adjusted threshold value. When the updated threshold value is confirmed 1140 by a user, the processor 110 may update the visualization result (e.g., a heatmap) of the first index with the updated threshold value and output the updated visualization result on a screen. For example, as the threshold value is lower, more cell membranes may be output as positive staining.

In addition, as the threshold value is adjusted, the processor 110 may update and display statistics according to a TPS or CPS corresponding to the pathological slide image and types of cells included in the pathological slide image. In other words, the processor 110 may change and output information output in the area 1110 and the area 1120, according to the updated threshold value.

For example, a number, which is displayed on the slide bar for adjusting the threshold value, may be expressed in a certain unit (e.g., 10). However, the user may continuously manipulate the slide bar, and accordingly, the threshold value may be determined as any number (e.g., 65) rather than a unit (e.g., 50 or 60) displayed on the slide bar.

The threshold value adjusted by the user may be intactly maintained as long as there is no other input. For example, even in the case where the user outputs another image, changes a page, or logs out of a program, the threshold value may remain at the same value. In addition, the threshold value may be set by each individual user, and a threshold value set by any one user may not affect another user who uses the same program.

Referring to FIG. 12, a graph 1220 showing a distribution of scores corresponding to a staining intensity of at least one of a cell membrane, cytoplasm, and a cell nucleus of cells included in a pathological slide image may be displayed on a screen 1200.

For example, a UI 1210 for selecting at least one of components of a cell may be output on the screen 1200. In the case where a user selects at least one of the components through the UI 1210, a distribution of scores corresponding to a staining intensity of the selected component may be displayed as a graph 1220 on the screen 1200.

For example, the graph 1220 may be in the form of a histogram-style chart. In addition, an x-axis of the graph 1220 may be set as a score (0 to 100) indicating the staining intensity, and a y-axis may be set as a distribution ratio (0% to 100%) of a cell corresponding to each intensity. However, the x-axis and y-axis of the graph 1220 are not limited to the above example and may be set according to various criteria.

As described above with reference to FIG. 9, in the case where an enlargement magnification set according to a user input is a preset magnification or more, the processor 110 may replace a heatmap generated on the basis of a score corresponding to a first index with visualization results of components of each of cells and display the same. For example, in the case where an enlargement magnification of a pathological slide image output on a screen is the maximum magnification or in the case where the enlargement magnification is included within a certain range, the processor 110 may replace a heatmap overlaid on the pathological slide image with subcell information and display the same. Hereinafter, examples in which subcell information is displayed on a screen are described with reference to FIGS. 13 and 14.

Figure 13:
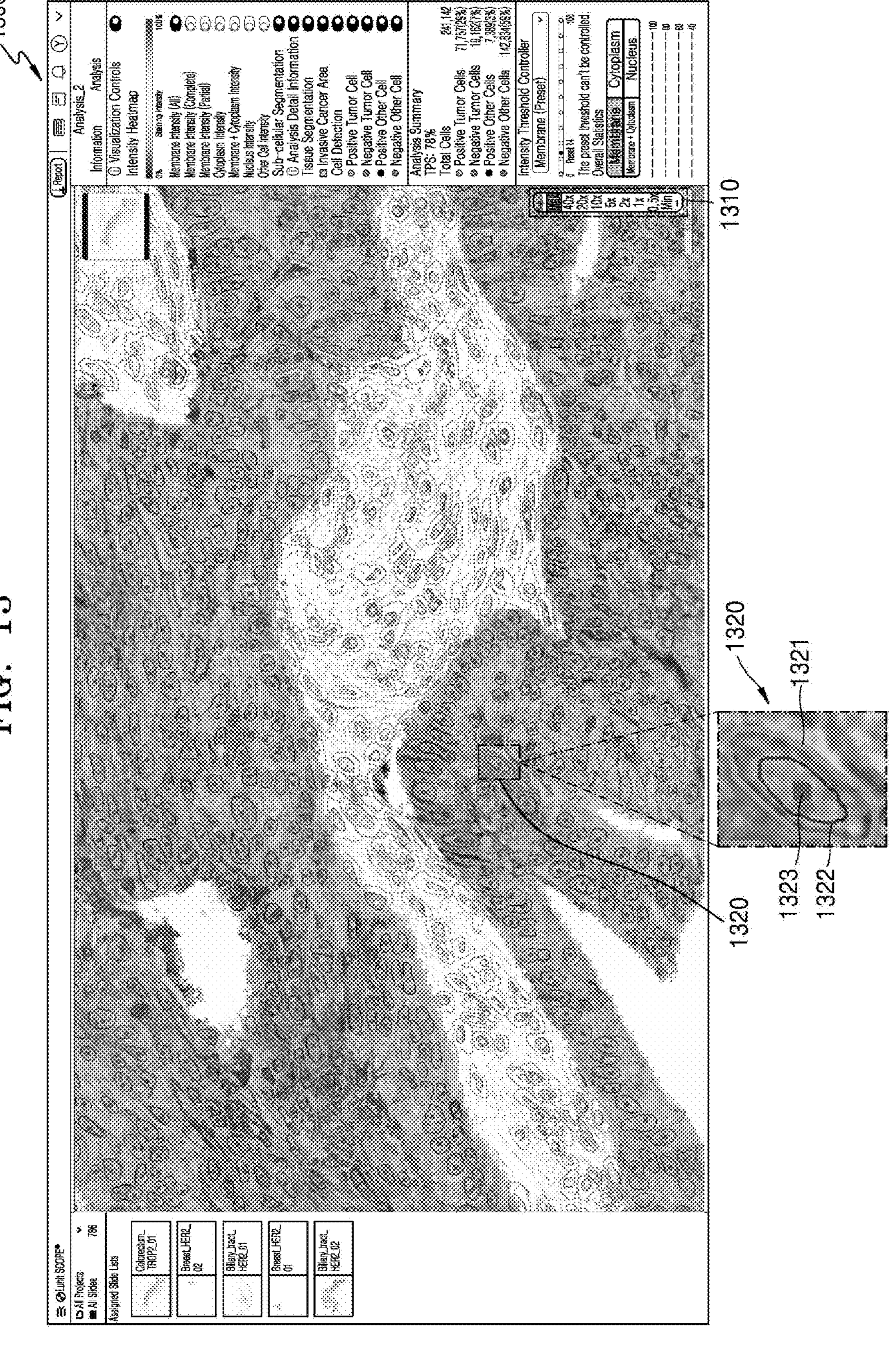
FIGS. 13 and 14 are views illustrating examples in which subcell information is displayed on a screen, according to an embodiment.

FIGS. 13 and 14 are views illustrating examples in which subcell information is displayed on a screen, according to an embodiment.

Referring to FIG. 13, visualization results of components of each of cells (i.e., a visualization result of subcell information) may be output on a screen 1300. For example, the visualization result may include at least one of a first visualization element in which an outline corresponding to a cell membrane of each of the cells is displayed in a certain color in the case where an enlargement magnification is the maximum magnification and a second visualization element in which a figure generated on the basis of a class corresponding to a second index is displayed at a central point of each of the cells in the case wherein the enlargement magnification is included within a certain range.

As a user adjusts a UI 1310, in the case where the enlargement magnification is included in a certain range (e.g., a range greater than or equal to 10 magnification and less than or equal to the maximum magnification), the second visualization element may be output on the screen 1300. Alternatively, as the user adjusts the UI 1310, in the case where the enlargement magnification becomes the maximum magnification, the first visualization element may be output on the screen 1300.

For example, the first visualization element may include an outline corresponding to a cell membrane 1322 of a cell 1320, which is displayed in a certain color. In addition, the second visualization element may include a FIG. 1323 which is generated on the basis of a class corresponding to a second index of the cell membrane 1322 and displayed at a central point of the cell 1320. In addition, a separate boundary 1321 may be output in an area having a certain margin from the cell membrane 1322 so that the cell 1320 may be distinguished from another cell.

For example, the user may set, on the screen 1300 by using the UI 1040 of FIG. 10, whether or not the outline (i.e., the first visualization element) corresponding to the cell membrane 1322 is displayed and whether or not the boundary 1321 is displayed.

The FIG. 1323 may be variously set on the basis of a level of staining (i.e., completeness of staining) of the cell membrane 1322. For example, with respect to the FIG. 1323, class 0 (negative or unstained) may be set to a rectangle of a first color, class 1 (partial staining) may be set to a square of a second color, and class 2 (complete staining) may be set to a circle, but the class 0, the class 1, and the class 2 are not limited thereto. A color of the FIG. 1323 may be determined as a color of a type of the cell 1320 corresponding to a detected cell (i.e., a positive/negative cancer cell or positive/negative other cells), according to the result of detecting the cell.

For example, the user may set, on the screen 1300 through the UI 1060 of FIG. 10, whether or not the FIG. 1323 (i.e., the second visualization element) is displayed at a central point of the cell 1320.

Referring to FIGS. 13 and 14, when an area indicator (e.g., a cursor or the like) is located within the outline by the user, the processor 110 may display a separate window 1410 in which information regarding the cell 1320 corresponding to the boundary 1321 (i.e., a cell located in an area within the outline) is written.

A staining intensity of the cell membrane 1322 and a staining intensity 1411 of cytoplasm may be displayed on the window 1410. For example, the staining intensity 1411 may be expressed as a percentage %. In addition, a type 1412 of the cell 1320 (i.e., a positive/negative cancer cell or positive/negative other cells) may be displayed on the window 1410. Also, a level of staining 1413 of the cell membrane 1322 may be displayed on the window 1410. For example, the level of staining 1413 may be any one of class 0, class 1, and class 2 as described above.

Meanwhile, as described above with reference to FIG. 10, as the user manipulates the UI 1040, an output function of the window 1410 may be activated or deactivated.

Figure 15:
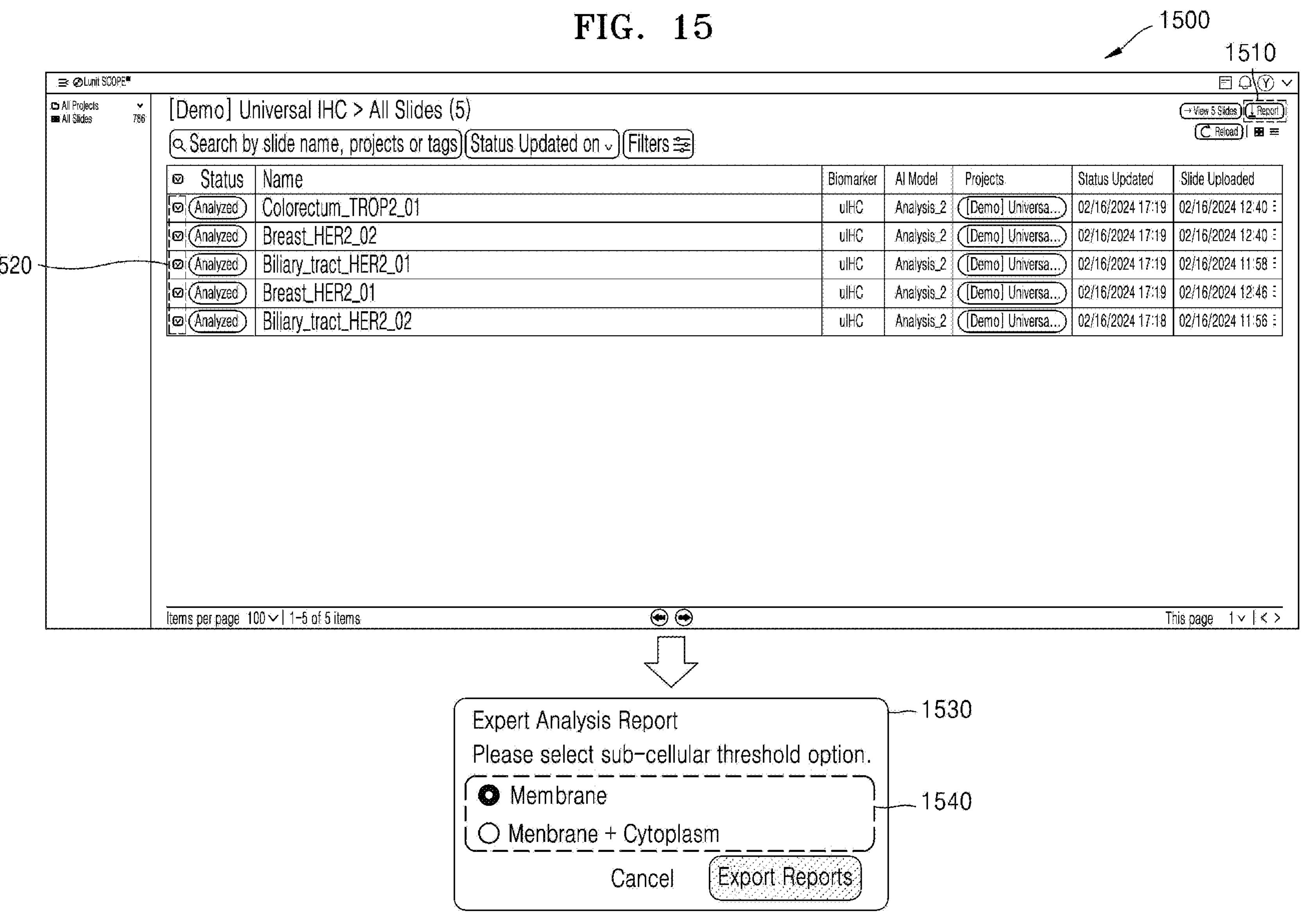
FIG. 15 is a view illustrating an example in which a report including the result of analyzing a pathological slide image is output, according to an embodiment.

FIG. 15 is a view illustrating an example in which a report including the result of analyzing a pathological slide image is output, according to an embodiment.

As described above with reference to FIG. 9, according to selection by a user, the result of analyzing a pathological slide image, which is output on the screen 900, may be output as a report. Meanwhile, the user may also collectively download reports on a plurality of pathological slide images.

Referring to FIG. 15, a list of a plurality of pathological slide images may be output on a screen 1500. The user may download a list of a plurality of images at once by selecting a check box displayed in one area of the screen 1500. For example, in the case where the user selects a plurality of images, a separate window 1530 may be displayed on the screen 1500. Here, the window 1530 may include an area 1540 in which information (e.g., subcell information) to be included in a report may be selected. Accordingly, the user may be provided with a report including desired information. Meanwhile, although not illustrated in FIG. 9, the window 1530 may be output even in the case where a report on an individual image is downloaded.

As described above with reference to FIGS. 1 to 15, the processor 110 may provide the user with various results of analysis of the pathological slide image. In addition, the processor 110 may provide additional information to the user by combining the results of analysis of the pathological slide image. The additional information may be included in the report and provided to the user.

For example, the processor 110 may perform continuous quantification on an expression of a target in a cancer tissue. Accordingly, information provided by the processor 110 may be used to discover a new and powerful biomarker. In other words, through continuous scale quantification by the processor 110, the user may set an accurate reference point for distinguishing between patients who respond better and worse to cancer treatment.

Hereinafter, examples in which information provided by the processor 110 is used are described with reference to FIGS. 16 and 17.

Figure 16:
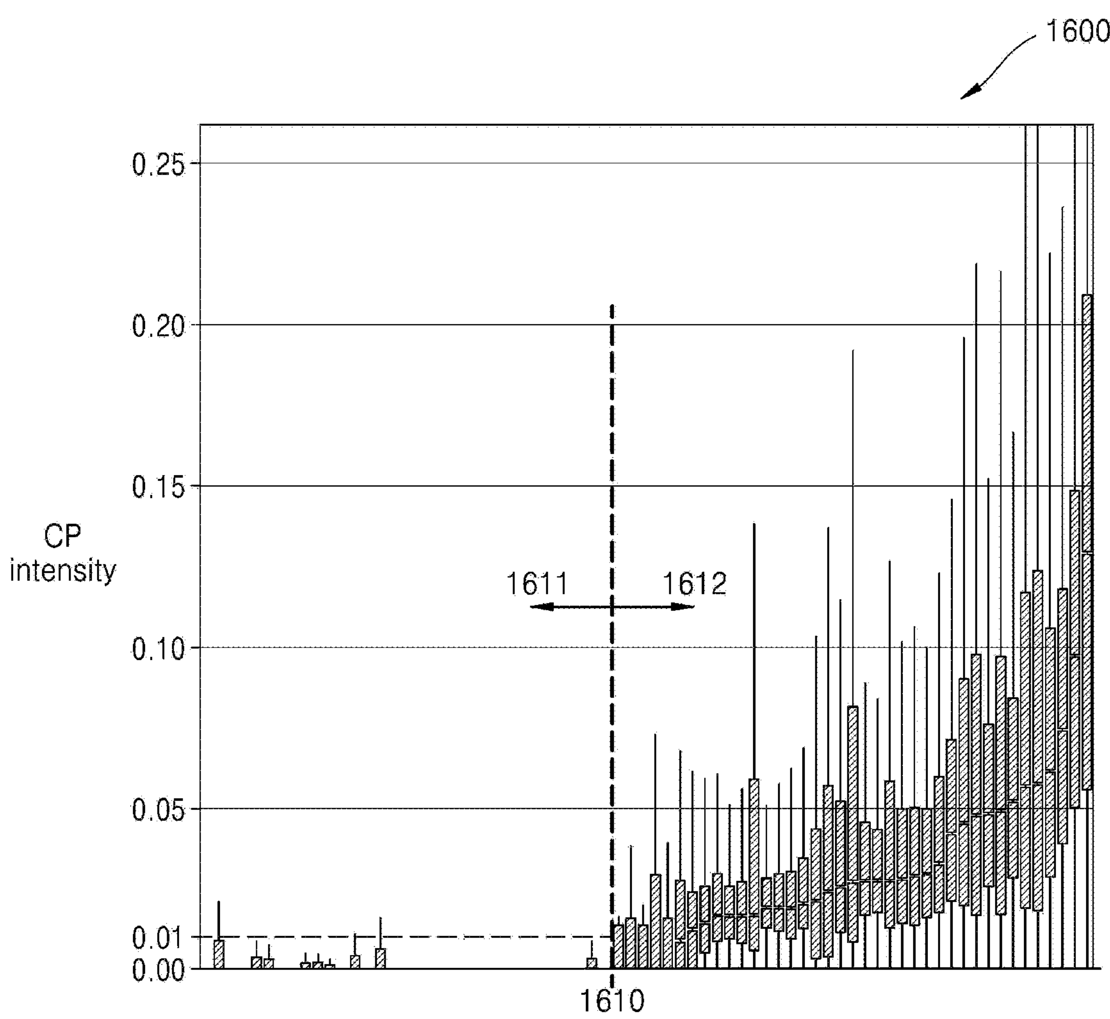
FIG. 16 is a view illustrating an example in which information provided by a processor is used, according to an embodiment.

FIG. 16 is a view illustrating an example in which information provided by a processor is used, according to an embodiment.

Referring to FIG. 16, each of bars in a graph 1600 may indicate an IHC-stained pathological slide image to confirm expression information of HER2 acquired from a breast cancer patient. In addition, a value of a y-axis of the graph 1600 may indicate a staining intensity of cytoplasm.

Images displayed in the graph 1600 may be images classified by a user (e.g., a pathologist) according to the staining intensity of the cytoplasm. For example, in the case where the staining intensity may be classified as 0, +1, +2, and +3 by the user, the images displayed in the graph 1600 may be images in which the staining intensity of the cytoplasm is commonly classified as 0.

As illustrated in FIG. 16, even in the case where pathological slide images have staining intensities that are classified as 0 by the user, the result of re-analysis by the processor 110 may have a non-zero value.

The processor 110 may estimate staining intensities of components of a cell on a continuous scale. Therefore, in the case where the result of analysis by the processor 110 is compared with the result of analysis by the user, the processor 110 may more accurately detect a low staining intensity of a pathological slide image than the user, and may more accurately distinguish small differences between staining intensities.

For example, a reference line 1610 displayed in the graph 1600 may be a reference for distinguishing between a pathological slide image in which a target biomarker is expressed in cytoplasm and a pathological slide image in which a target biomarker is not expressed in cytoplasm. As an example, a reference value of a staining intensity of cytoplasm for determining whether or not a target biomarker is expressed may be 0.01.

In detail, pathological slide images (i.e., a right portion 1612 on the basis of the reference line 1610) in which a value of a staining intensity of cytoplasm is greater than or equal to a reference may be regarded as images of patients who respond better to cancer treatment. Meanwhile, pathological slide images (i.e., a left portion 1611 on the basis of the reference line 1610) in which a value of a staining intensity of cytoplasm is lower than the reference may be regarded as images of patients who respond worse to cancer treatment.

As described above with reference to FIG. 16, on the basis of a staining intensity of cytoplasm identified by the processor 110, the user may determine a reference for distinguishing between patients who respond better and worse to cancer treatment.

Meanwhile, the example in which the information generated by the processor 110 is used is not limited to the example of identifying the reference point of the staining intensity of the cytoplasm as a new biomarker. The processor 110 may quantify various types of target expression information that may not be distinguished by the user (e.g., a pathologist). Accordingly, the information generated by the processor 110 may be used to discover a previously undiscovered biomarker.

In an embodiment, a third index indicating cell membrane specificity may be calculated on the basis of at least one of a first score corresponding to a staining intensity of a cell membrane of a cell, a second score corresponding to a staining intensity of cytoplasm of the cell, a third score corresponding to a staining intensity of a cell nucleus of the cell, and a second index, which are generated by the processor 110.

The cell membrane specificity may refer to an index indicating how much of a targeted object is present in a cell membrane. As an example, a great value of the cell membrane specificity may indicate that staining is dark on the cell membrane, which may be referred to as an outer area of a cell, rather than an inner area of the cell such as cytoplasm or a cell nucleus. In other words, the same may indicate that a cell is more likely to come into contact with a drug that uses a corresponding target and thus makes the drug more effective, and thus, the cell membrane specificity may be used to determine whether or not the corresponding drug may be an effective treatment method for a patient. In addition, a small value of the cell membrane specificity may indicate that staining is dark in a structure (e.g., cytoplasm, the cell nucleus, or the like) rather than the cell membrane. In this case, information significant for prediction of a prognosis of the patient, prediction of the degree of response of the drug, and the like may also be provided to indicate information regarding the degree of expression.

In an embodiment, the cell membrane specificity may be calculated in a method of calculating a staining intensity of the cell membrane relative to another component by using a ratio of or a difference in the staining intensity and may include an example of membrane intensity/(membrane intensity+cytoplasm intensity+nucleus intensity) or (membrane intensity-cytoplasm intensity)/(membrane intensity+cytoplasm intensity). An exact calculation formula for the third index may include various types of methods using one or more of first indices and/or a second index and is not limited to the above example.

An embodiment in which the processor 110 analyzes an anti-cancer target or predicts a treatment response by using a value obtaining by quantifying cell membrane specificity is described below by using the drawings below.

Figure 17A:
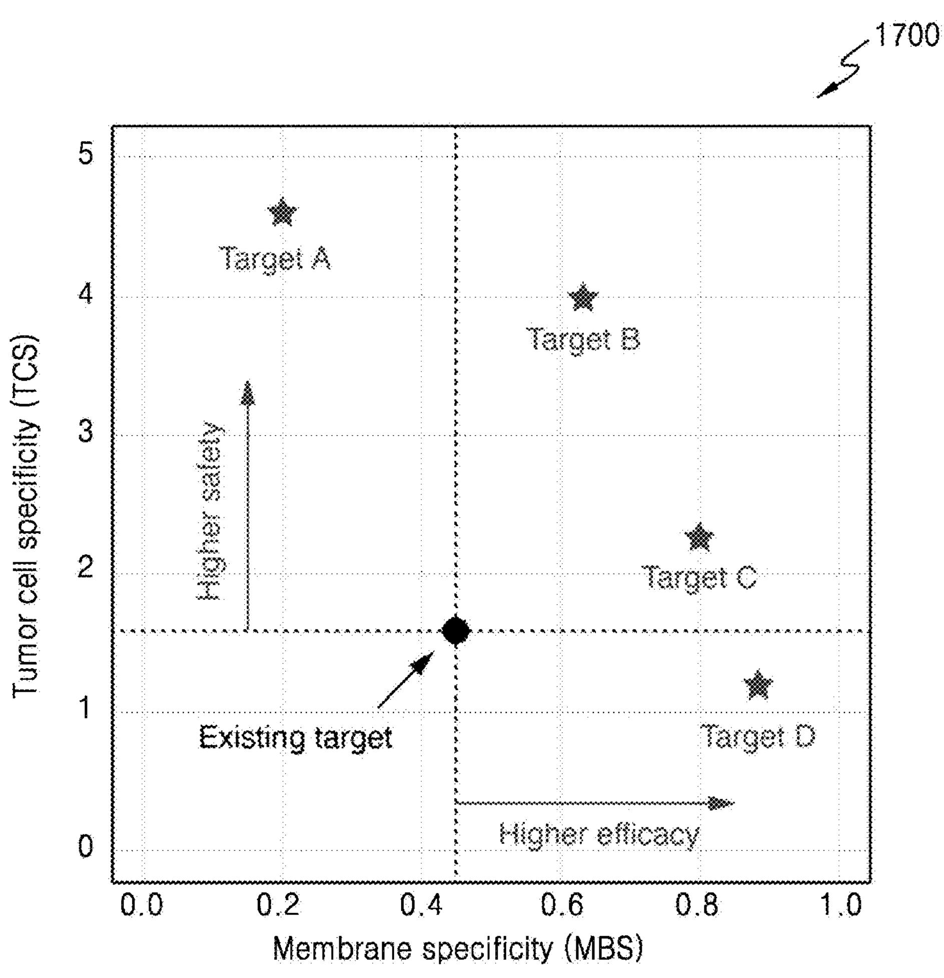
FIGS. 17A and 17B are views illustrating another example in which information provided by a processor is used, according to an embodiment.
Figure 17B:
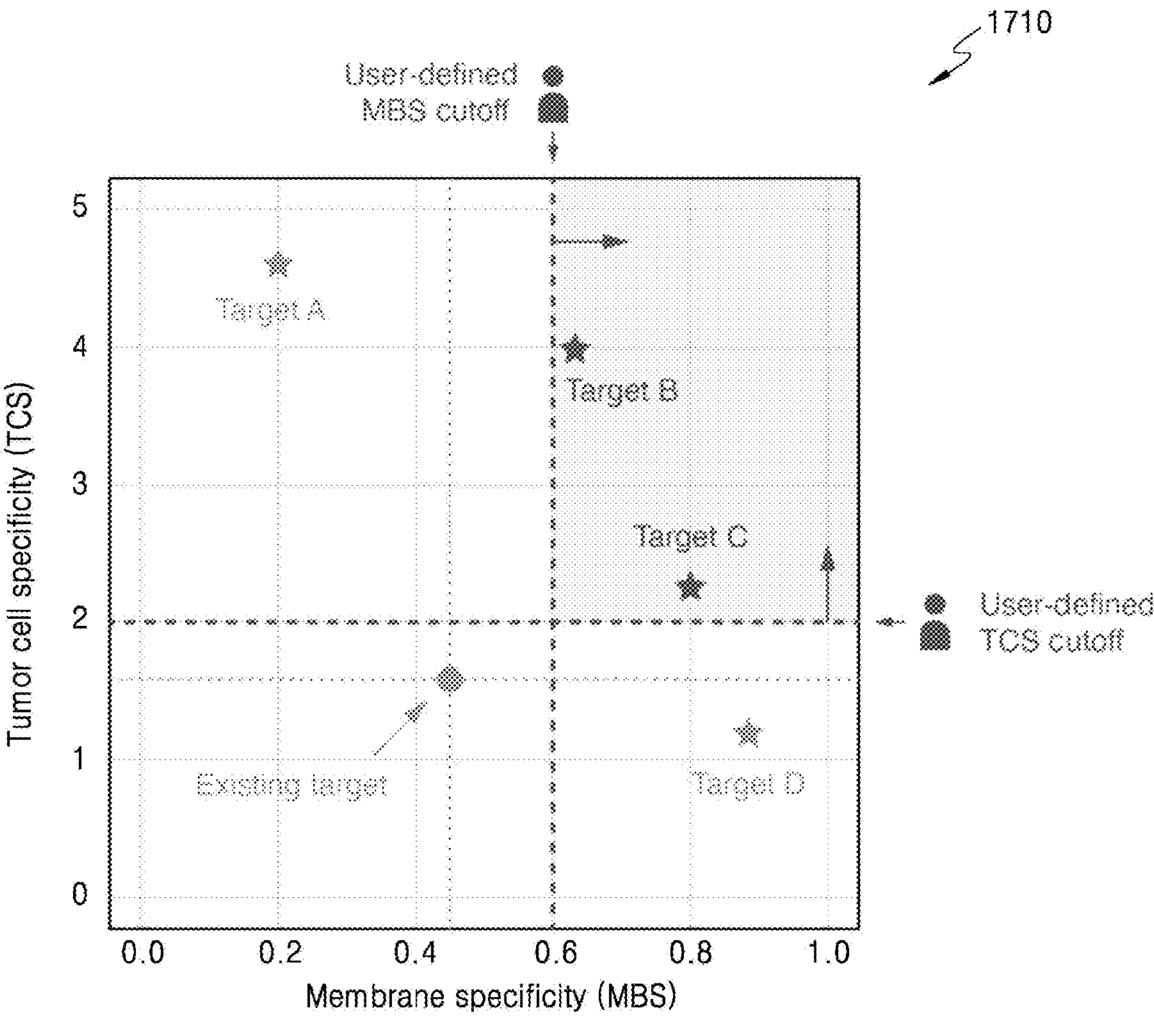

FIGS. 17A and 17B are views illustrating another example in which information provided by a processor is used, according to an embodiment.

Referring to FIG. 17A, information generated by the processor 110 may be used to evaluate safety and efficacy of a new anti-cancer target in a new drug development process. For example, the processor 110 may output the results of quantifying tumor cell specificity and cell membrane specificity that are main features for determining an appropriate anti-cancer target. Here, the quantified results may be output in a graph 1700. Referring to FIG. 17A, a targeted object may include a gene, a protein or neoantigen that is a product expressed and produced from the gene, and the like.

A value of a y-axis of the graph 1700 may indicate the tumor cell specificity. Here, the tumor cell specificity may refer to a relative proportion of tumor cells from among positive cells included in a pathological slide image. Therefore, the tumor cell specificity may indicate a comparison value for the degree of expression of a corresponding protein between a tumor cell and a normal cell. High tumor cell specificity may indicate that a corresponding target is specifically expressed only in a tumor cell. Therefore, in the case where a protein having high tumor cell specificity is used as an anti-cancer target in a new drug development process, a new drug, which may kill only a tumor cell without affecting a normal cell at all and thus have low side effects and high safety, may be developed.

A value of an x-axis of the graph 1700 may indicate cell membrane specificity. As an example, the cell membrane specificity may refer to a ratio of a staining intensity of a cell membrane to the sum of the staining intensity of the cell membrane, a staining intensity of cytoplasm, and a staining intensity of a cell nucleus, but is not limited thereto.

A staining intensity of each of components of a cell may be calculated as an average of staining intensities of the components of the cell included in a pathological slide image. A value of cell membrane specificity may be related to an amount of target for the drug distributed on the surface of the cell. Here, the amount of target may refer to an amount of actual target molecules capable of reacting to the drug. Therefore, as a value of cell membrane specificity for a particular drug is higher, a patient may be highly likely to respond to the corresponding drug. Accordingly, in the case where a staining intensity of a cell membrane is high, a target may be widely distributed on the surface of a cell, and a patient may be highly likely to respond to a drug associated with the corresponding target. For example, in the case of a drug targeting HER2, the drug may more efficiently work when many HER2 molecules are distributed on a surface of a tumor cell.

In an embodiment, the processor 110 may use, as an input, an IHC-stained pathological slide from which an expression of an anti-cancer target may be examined. Also, the processor 110 may not only analyze features such as safety and efficacy for one anti-cancer target but also analyze features such as safety and efficacy for a plurality of anti-cancer targets (e.g., a target A, a target B, a target C, and a target D) simultaneously and receive a user input for selecting an anti-cancer target appropriate for a condition.

The processor 110 may detect tumor cells and normal cells (i.e., other cells) from a pathological slide image. Therefore, the processor 110 may determine a value corresponding to tumor cell specificity, on the basis of the tumor cells and the normal cells.

The processor 110 may calculate scores of staining intensities of components of the cell (e.g., a cell membrane, cytoplasm, a cell nucleus). Accordingly, the processor 110 may determine a value corresponding to the cell membrane specificity by using a score of a staining intensity of the cell membrane, a score of a staining intensity of the cytoplasm, and a score of a staining intensity of the cell nucleus.

Referring to FIG. 17A, the processor 110 may determine which of a plurality of biomarkers (the target gene A, the target B, the target C, and the target gene D) is an anti-cancer target (i.e., an appropriate drug) appropriate for a particular patient. In detail, the processor 110 may determine tumor cell specificity and cell membrane specificity for each of anti-cancer targets.

In an embodiment, the processor 110 may generate a report on anti-cancer targets by using the results of quantifying the tumor cell specificity and the cell membrane specificity. The report may be provided as a file, data, text, an image, or the like having a format which may be output through a user terminal and/or an output device. As an example, the report may include at least one of the graph 1700 visualized by comparing a value of tumor cell specificity and a value of cell membrane specificity of at least one anti-cancer target with a value of tumor cell specificity and a value of cell membrane specificity of an existing target gene, the value of the tumor cell specificity and the value of the cell membrane specificity of the existing target gene, a value of tumor cell specificity of each of the at least one anti-cancer target, a value of cell membrane specificity of each of the at least one anti-cancer target, additional information regarding an anti-cancer target, information regarding at least one recommended anti-cancer target, comparative analysis data regarding anti-cancer targets selected by a user, comparative analysis data regarding at least one anti-cancer targe (e.g., the target B and the target C) included in a particular group (e.g., a group in which both a value of tumor cell specificity and a value of cell membrane specificity are greater than the existing target gene), at least one pathological slide image used to analyze an anti-cancer target, a reference value of tumor cell specificity, and a reference value of cell membrane specificity.

In an embodiment, the processor 110 may receive an input regarding a priority criterion from the user. In other words, the user may input, as the priority criterion, at least one of a safety criterion corresponding to tumor cell specificity and an efficacy criterion corresponding to cell membrane specificity. The processor 110 may generate the report and/or the graph 1700 on the basis of the priority criterion input by the user. As an example, in the case where the user selects to prioritize the efficacy criterion corresponding to the cell membrane specificity, the processor 110 may output, on the report and/or the graph 1700, only the target B, the target C, and the target D that satisfy the priority criterion input by the user. As another example, the processor 110 may visualize at least one target satisfying a priority criterion input by the user to be distinguished from other targets, on the basis of the priority criterion. For example, the at least one target satisfying the priority criterion input by the user may be output, on the graph 1700, in a different color, icon, and the like from the other targets. In addition, the processor 110 may provide additional detailed information regarding the at least one target satisfying the priority criterion input by the user.

In an embodiment, the processor 110 may provide additional information regarding targets (i.e., the target B and the target C) having higher safety and efficacy than the existing target gene. In other words, the processor 110 may assist the user in target selection by outputting the additional information regarding the targets having the higher safety and efficacy than the existing target gene on the report and/or on a screen. As an example, the additional information may include information obtained by comparing the targets having the higher safety and efficacy than the existing target gene, additional analysis information regarding the targets, and the like.

A method by which the processor 110 receives a reference value as an input from a user and outputs a result by considering the reference value is described with reference to FIG. 17B.

In an embodiment, the processor 110 may receive, as an input, a reference value for at least one of tumor cell specificity and cell membrane specificity from a user. For example, in the case where the processor 110 receives the reference value for the tumor cell specificity as 2 from the user and receives the reference value for the cell membrane specificity as 0.6 from the user, the processor 110 may display the reference values input by the user as vertical or horizontal solid lines or dotted lines on a graph 1710. Also, the processor 110 may output only a target B and a target C, which are targets satisfying values greater than or qual to the corresponding reference values, on the graph 1710, or may change output representations of the target B and the target C so that the target B and the target C are distinguished from other targets and output the changed representations on the graph 1710 and/or a report.

For example, the user (e.g., new drug development companies) may examine, on the graph 1710, how much higher safety and efficacy anti-cancer target gene candidates have than an existing target gene being sold or developed on the market. Accordingly, the user may determine whether to select a target A having slightly less efficacy than the existing target gene but having the highest safety by placing a slightly higher priority on safety, select a target D having slightly less safety than the existing target gene but having the highest efficacy by placing a slightly higher priority on efficacy, or select the target B or the target C by considering both safety and efficacy. In addition, the processor 110 may enable quantitative comparison between targets, and thus, the user may selecta a target from among targets having higher safety and efficacy than the existing target gene by considering whether to place a higher priority on safety (the target B) or placing a higher priority on efficacy (the target C). Accordingly, the user may easily understand features of each anti-cancer target by using analysis data provided by the processor 110 and may intuitively understand the result of comparing anti-cancer targets that the user wants to analyze, with the existing target gene, and thus, the processor 110 may assist the user in determining an anti-cancer target.

In addition, the processor 110 may efficiently process and analyze in parallel large-scale IHC-stained pathological slide images, which are produced to enable expressions of various types of anti-cancer targets to be examined, so that expressions of respective biomarkers may be examined and thus may rapidly verify information related to which biomarker is an anti-cancer target appropriate for a particular patient, and accordingly, may provide the result of rapid analysis to the user to increase the speed of development of a new drug.

Another embodiment of using cell membrane specificity from among indices provided by the processor 110 may include prediction of a treatment response to a drug. A treatment response may be expected to be high when a value of the cell membrane specificity is high, according to a protein that is a target to be stained. In general, in the case where the protein that is the target to be stained is the same as a target for a drug used, finding a group of patients who show the above aspect and are expected to have a high response to treatment may also be a significant process in a process of developing a new drug.

Figure 18:
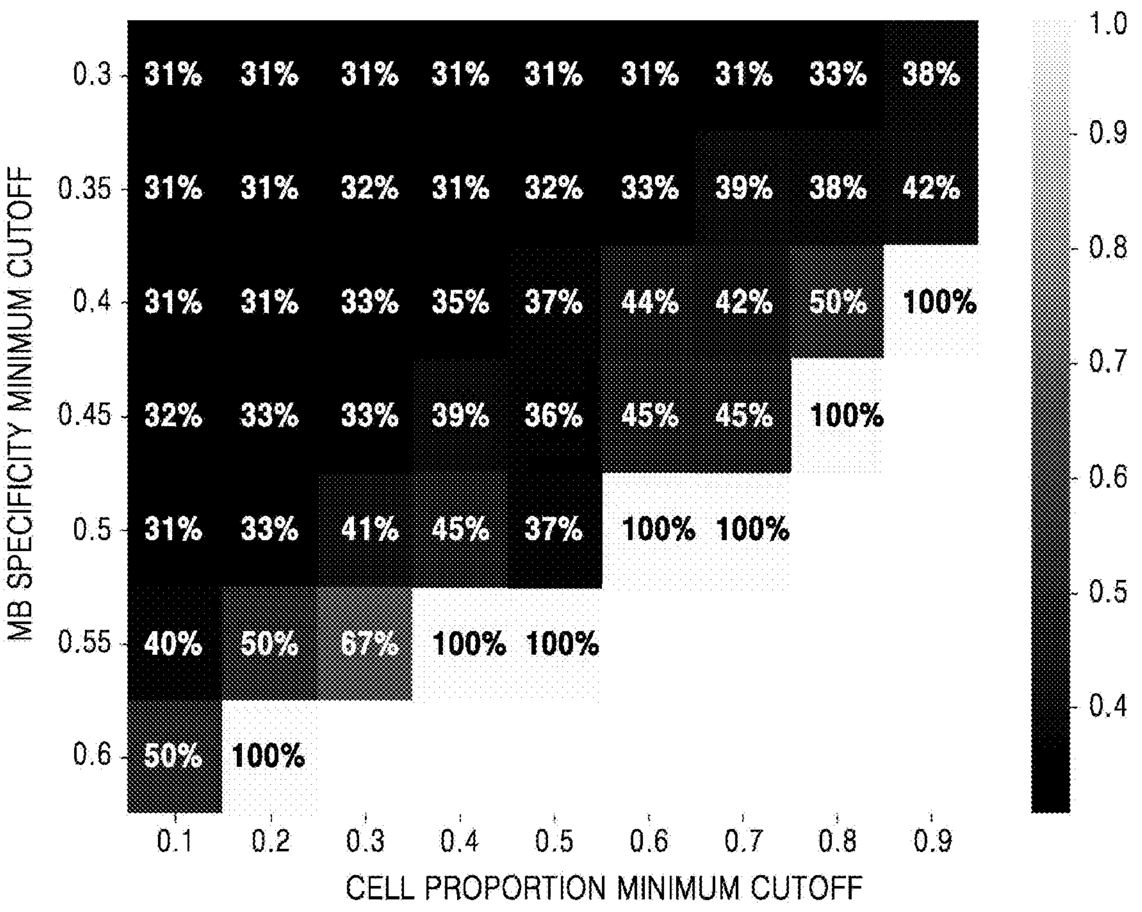
FIG. 18 is a view illustrating a method by which a processor predicts a treatment response by using cell membrane specificity.

FIG. 18 is a view illustrating a method by which a processor predicts a treatment response by using cell membrane specificity, according to an embodiment.

FIG. 18 illustrates an example of identifying the number of target patients and the degree of treatment response at various reference points by using information regarding a tumor cell (e.g., a fraction of the tumor cell), which is provided by the process 110, and information regarding cell membrane specificity of tumor cells. The processor 110 may consider various numerical values for cell membrane specificity (on a y-axis) to define a tumor cell exhibiting cell membrane-specific stainability and variously consider even a fraction of a cell (on an x-axis) exhibiting cell membrane-specific stainability from among tumor cells identified by the processor 110. FIG. 18 illustrates an example of numericalizing the degree of treatment response in a target patient group. Referring to FIG. 18, in the case wherein a fraction of a cell having a value of cell membrane specificity of 0.55 or more is 0.1 or more, the processor 110 may output 37% as treatment response prediction information in the target patient group, and in the case where the fraction of the cell having the value of cell membrane specificity of 0.55 or more is 0.3 or more, the processor 110 may output 67% as the treatment response prediction information in the target patient group. In addition, as illustrated in FIG. 18, the processor 110 may output the treatment response prediction information as a heatmap by using different colors according to the degree of treatment response.

In an embodiment, the processor 110 may acquire a pathological slide image of at least one patient from which a treatment response is desired to be checked. The processor 110 may determine cell membrane specificity on the basis of at least one of a first score corresponding to a staining intensity of a cell membrane of a cell, a second score corresponding to a staining intensity of cytoplasm of the cell, a third score corresponding to a staining intensity of a cell nucleus of the cell, and a second index. The processor 110 may determine a fraction of a cell by checking a tumor cell corresponding to cell membrane specificity from among all tumor cells within the pathological slide image.

In an embodiment, the processor 110 may determine a treatment response of a patient corresponding to the corresponding pathological slide image by using at least one of a value of the cell membrane specificity and the fraction of the tumor cell corresponding to the cell membrane specificity. In an embodiment, FIG. 18 illustrates an example of the case where a response is expected to be high in the case where a value of cell membrane specificity is great, but the disclosure is not limited to the case. In the case where a fraction of a cell having a small value of cell membrane specificity is above a certain numerical value, the fraction of the cell may operate as a biomarker for predicting a treatment response, according to types of staining and a drug. Accordingly, cell membrane specificity and a fraction of a cell membrane-specific tumor cell, which are provided by the processor 110, may be used as biomarkers for predicting a treatment response and are not limited to a type of a specific drug or immunostaining.

In an embodiment, the processor 110 may output a report including the result of the treatment response of the patient corresponding to the pathological slide image. The report may be provided as a file, data, text, an image, or the like having a format which may be output through a user terminal and/or an output device. As an example, the report may include at least one of treatment response prediction information (e.g., a score, a probability, a class, or the like) of the corresponding patient, the number of cells having a first score corresponding to a staining intensity of cell membrane of a cell, the number of cells having a second score corresponding to a staining intensity of cytoplasm of the cell, the number of cells having a third score corresponding to a staining intensity of a cell nucleus of the cell, and the number of cells having a third index (cell membrane specificity) above a particular reference value or more.

In an embodiment, the processor 110 may visualize cell membrane specificity and output, by cell, the visualized cell membrane specificity in a pathological slide image. As an example, cells having the same value of cell membrane specificity may be output by using the same index, and cells having different values of cell membrane specificity may be output by using different indices to be distinguished from the cells having the same value of cell membrane specificity. As another example, values of cell membrane specificity may be divided into two or more groups and output on the pathological slide image. As an example, cells may be classified into a first group in the case where a value of cell membrane specificity is greater than or equal to a first value and less than a second value and may be classified into a second group in the case where the value of the cell membrane specificity is greater than the second value and less than a third value. Respective groups may be output on a panel for outputting the pathological slide image and/or information regarding the pathological slide image by using different indices. Indices for classifying and outputting cells may be displayed by using colors, icons, text, and the like and are not limited to the example described above.

In an embodiment, the processor 110 may output an object that may receive a user input for adjusting a threshold value of cell membrane specificity. The processor 110 may receive the threshold value of the cell membrane specificity from a user and update cell membrane specificity information output from the pathological slide image, on the basis of the threshold value of the cell membrane specificity. As an example, the processor 110 may output, within the pathological slide image, only cells having a value of cell membrane specificity greater than the threshold value of the cell membrane specificity, or may distinguish and output cells having a value of cell membrane specificity less than the threshold value and cells having a value of cell membrane specificity greater than the threshold value by using different indices (e.g., highlight representations). In addition, on the basis of the threshold value of the cell membrane specificity, the processor 110 may calculate a fraction of a tumor cell that is cell membrane-specific stained and output the updated fraction of the tumor cell.

In an embodiment, the processor 110 may output a heatmap on the basis of a value of cell membrane specificity. As an example, a heatmap having low transparency may be output in an area in which cells having the same value of cell membrane specificity are concentrated, and a heatmap having high transparency may be output in an area in which cells having the same value of cell membrane specificity are not concentrated.

In an embodiment, the processor 110 may output the result of analyzing data regarding a plurality of patients on the basis of a set value of cell membrane specificity. Here, the set value of cell membrane specificity may be set by the processor, may be set by the user, or may be set by the processor 110 and then modified by the user. As an example, in the case where the set value of cell membrane specificity is 0.5, the processor 110 may output fraction information (a value between 0 and 1) of a tumor cell corresponding to the set value of cell membrane specificity for a plurality of pieces of patient data. Also, the processor 110 may output at least one of identification information indicating a plurality of pathological slide images and treatment response prediction information (e.g., a score, a probability, a class, and the like) corresponding to fraction values of various types of tumor cells.

In an embodiment, the processor 110 may output a recommended combination of a value of cell membrane specificity and a fraction of a tumor cell corresponding to the cell membrane specificity. As an example, referring to FIG. 18, on the basis of at least one of the number of patient groups satisfying a combination of cell membrane specificity and a fraction of a tumor cell, and treatment response prediction information, the processor 110 may output, on a report and/or a screen, a combination in which a value of cell membrane specificity is 0.55 and a value of a fraction of a tumor cell corresponding to the cell membrane specificity is 0.3.

Meanwhile, the processor 110 may quantify heterogeneity of a tissue sample. The heterogeneity of the tissue sample may cause a difference in a treatment response of the corresponding patient. For example, even in the case where a sample shows the same average value for a staining intensity and heterogeneity thereof is greater, a cell that responds well and a cell that does not respond well may be mixed, and thus, a treatment response may become poor. For example, the processor 110 may quantify how heterogeneous the staining intensity is (i.e., heterogeneity of the staining intensity), how heterogeneous a size of a tumor cell is (i.e., heterogeneity of the size of the tumor cell), or how heterogeneous a size of a tumor cell nucleus is (i.e., heterogeneity of the size of the tumor cell nucleus).

For example, the processor 110 may determine how heterogeneous the staining intensity of the pathological slide image is, on the basis of at least one of detection of a cell, segmentation into subcells (i.e., segmentation of the cell into components), prediction of scores of staining intensities of the subcells, and classification of a level of staining of a cell membrane (i.e., completeness of staining).

A staining intensity may be quantified for each cell, and thus, heterogeneity may be high in the case where a distribution of a staining intensity of each cell may be more widely spread. In other words, in the case where a distribution pattern of staining intensities is confirmed on the basis of individual analysis of all tumor cells within a sample, whether the staining intensities are more heterogeneous or less heterogeneous may be quantified.

In addition, the processor 110 may determine how heterogeneous sizes of tumor cells in the pathological slide image are, on the basis of at least one of detection of a cell, segmentation into subcells, prediction of scores of staining intensities of the subcells, and classification of a level of staining (i.e., completeness of staining) of a cell membrane. The processor 110 may measure a size of an individual cell through the result of subcell segmentation, and heterogeneity may be quantified through a distribution of a value thereof.

In addition, the processor 110 may determine how heterogeneous nucleus sizes of the tumor cells in the pathological slide images are, on the basis of at least one of cell detection, segmentation into subcells, prediction of scores of staining intensities of the subcells, and classification of the level of staining (i.e., completeness of staining) of the cell membrane. The processor 110 may measure a size of a cell nucleus of an individual cell through the result of subcell segmentation, and heterogeneity may be quantified through a distribution of a value thereof.

In general, in the case where heterogeneity of a tumor cell is high, treatment resistance may be high. For example, in the case where cancer includes heterogeneous and various cancer cells, while some cancer cells respond to particular treatment, cancer cells having different features may not respond to treatment. Therefore, cancer having heterogeneous features may have a high risk of recurrence. Therefore, as the processor 110 quantitatively evaluates tumor heterogeneity, the user may predict a risk of recurrence of cancer of a patient.

Figure 19:
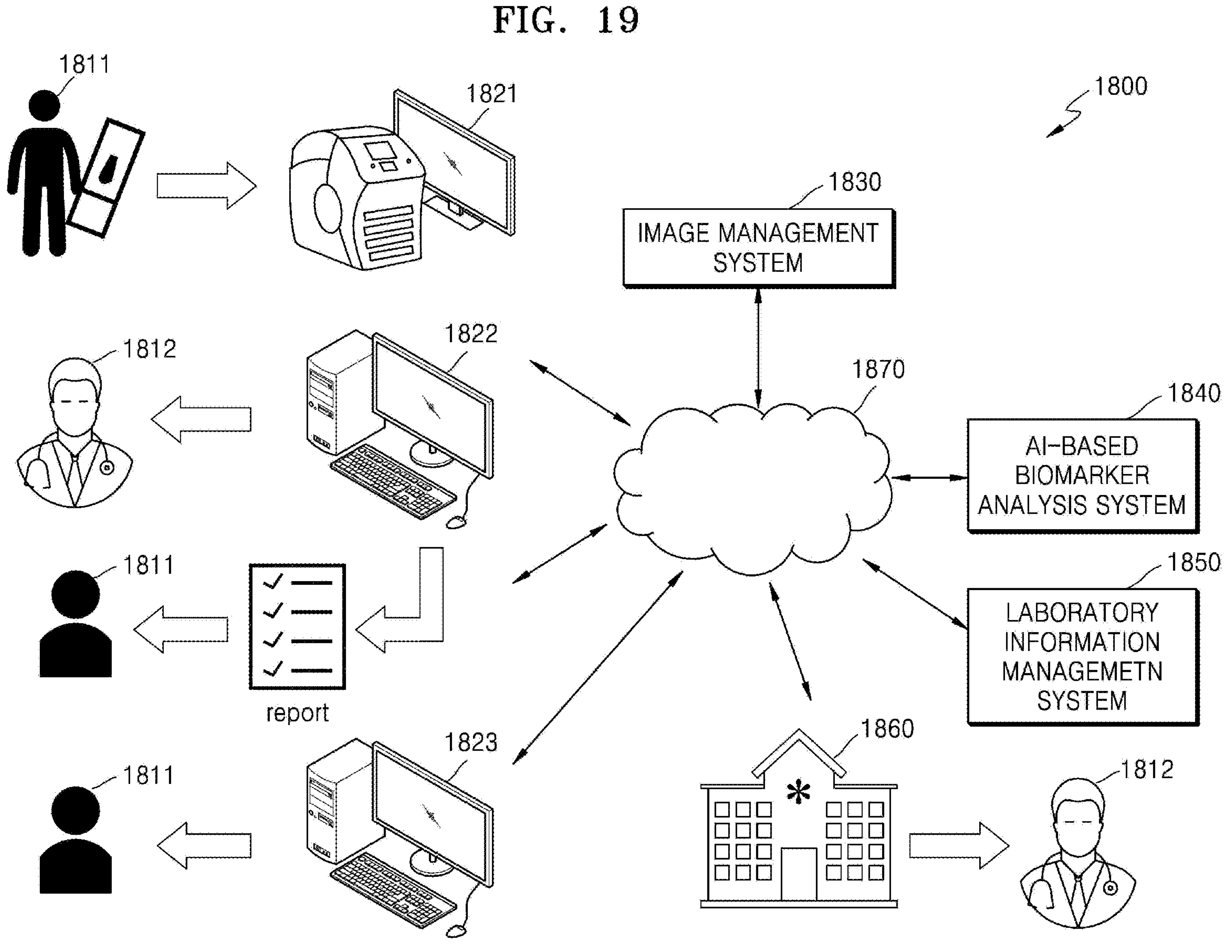
FIG. 19 is a view illustrating an example of a system for analyzing a pathological slide image.

FIG. 19 is a view illustrating an example of a system for analyzing a pathological slide image.

Referring to FIG. 19, a system 1800 may be an example of a system and network for providing, processing, and reviewing slide images of tissue samples by using a machine learning model.

According to various embodiments, the method described above with reference to FIGS. 2A to 18 may be performed by at least one of user terminals 1822 and 1823, an image management system 1830, an AI-based biomarker analysis system 1840, a laboratory information management system 1850, and a hospital or research laboratory server 1860, or a combination thereof.

A scanner 1821 may acquire a digitized image from a tissue sample slide generated by using a tissue sample of a subject 1811. For example, the scanner 1821, the user terminals 1822 and 1823, the image management system 1830, the AI-based biomarker analysis system 1840, the laboratory information management system 1850, and/or the hospital or research laboratory server 1860 may each be connected to a network 1870, such as the Internet, through one or more computers, servers, and/or mobile devices, or may communicate with a user 1812 through one or more computers, and/or mobile devices.

The user terminals 1822 and 1823, the image management system 1830, the AI-based biomarker analysis system 1840, the laboratory information management system 1850, and/or the hospital or research laboratory server 1860 may generate tissue samples of one or more subjects 1811, a tissue sample slide (e.g., a pathological slide), digitized images of the tissue sample slide (e.g., the pathological slide), or any combination thereof, or may otherwise be acquired from other apparatuses. In addition, the user terminals 1822 and 1823, the image management system 1830, the AI-based biomarker analysis system 1840, the laboratory information management system 1850, and/or the hospital or research laboratory server 1860 may acquire any combination of subject-specific information, such as age, medical history, cancer treatment history, family history, past biopsy records, and disease information of the subject 1811.

The scanner 1821, the user terminals 1822 and 1823, the AI-based biomarker analysis system 1840, the laboratory information management system 1850, and/or the hospital or research laboratory server 1860 may transmit the digitized slide image, the subject-specific information, and/or the result of analyzing the digitized slide image to the image management system 1830 through the network 1870. The image management system 1830 may include a storage for storing a received image and a storage for storing the result of analysis.

In addition, according to various embodiments, a machine learning model, which is learned and trained to predict at least one of information regarding at least one cell, information regarding at least one area, information related to a biomarker, medical diagnosis information, and/or medical treatment information from a slide image of the subject 1811, may be stored and operated in the user terminals 1822 and 1823, the image management system 1830, and the like.

As described above, a high-performance cell segmentation algorithm (i.e., cell nucleus segmentation, cytoplasm segmentation, or cell membrane segmentation) may be implemented. In addition, the result of analyzing the pathological slide image 10 in multilateral manner may be output. Therefore, the user may perform a follow-up procedure, such as medical treatment, by using a desired type of output value from among output values included in the result of the analysis.

In addition, the computing apparatus 20 may quantitatively analyze a tissue and a cell in the pathological slide image 10, and thus, the computing apparatus 20 or a program executed on the computing apparatus 20 may be a general-purpose analysis tool of the pathological slide image 10.

In addition, the computing apparatus 20 may provide a screen on which the user may intuitively check information regarding staining intensities of components of each of cells included in the pathological slide image 10.

Meanwhile, the above-described method may be written as a program that may be executed on a computer and may be implemented in a general-purpose digital computer that operates the program by using a computer-readable recording medium. In addition, a structure of data used in the above-described method may be recorded on a computer-readable recording medium through various means. The computer-readable recording medium may include a storage medium such as a magnetic storage medium (e.g., ROM, RAM, a USB, a floppy disk, a hard disk, or the like) and an optical reading medium (e.g., CD-ROM, DVD, or the like).

Those skilled in the art related to the present embodiment may understand that the above-described method may be implemented in a modified form without departing from the essential characteristics of the above description. Therefore, the provided methods should be considered in an illustrative sense rather than a restrictive sense, and the scope of rights should be defined by claims rather than by the foregoing description and should be construed as including all differences falling within the scope equivalent thereto.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A computing apparatus comprising:

a memory storing at least one program; and a processor configured to perform at least one operation by executing the at least one program, wherein the processor is further configured to:

analyze a pathological slide image to classify at least one of cells and tissues included in the pathological slide image into at least one type;

segment the pathological slide image into subpatches based on a result of the classification;

analyze the subpatches to output information regarding components of a cell included in each of the subpatches;

generate, by using a machine learning model, subcell information including a first index and a second index for at least one of the components determined based on information regarding the subpatches and the components;

calculate a third index corresponding to a cell membrane specificity of the at least one of cells and tissues included in the pathological slide image based on the second index, wherein the cell membrane specificity indicates how much of a targeted object is present in a cell membrane of the cell;

control a display apparatus to display information regarding the third index of the at least one of cells and tissues;

control the display apparatus to display at least one of a visualization result of the second index for at least one of components of each of cells included in the pathological slide image and a visualization result of the first index for any one of the components;

control the display apparatus to display a graph indicating a distribution of scores corresponding to a staining intensity of at least one of a membrane, cytoplasm, and a cell nucleus of each of the cells included in the pathological slide image; and control the display apparatus to replace a heatmap generated based on a score corresponding to the second index with visualization results of components of each of the cells and display the visualization result, based on an enlargement magnification set according to a user input being a preset magnification or more, wherein the visualization results of the components of each of the cells comprise at least one of a first visualization element in which an outline corresponding to a cell membrane of each of the cells is displayed in a certain color and a second visualization element in which a figure generated based on a class corresponding to the first index being displayed at a central point of each of the cells.

2. The computing apparatus of claim 1, wherein the first index comprises a class corresponding to a level of staining of the cell membrane of the cell, and the second index comprises at least one of a first score corresponding to a staining intensity of the cell membrane of the cell, a second score corresponding to a staining intensity of cytoplasm of the cell, and a third score corresponding to a staining intensity of a cell nucleus of the cell.

3. The computing apparatus of claim 2, wherein the processor is further configured to:

convert a format of the subpatches;

calculate a histogram of each of color channels for the cell membrane, the cytoplasm, and the cell nucleus included in the converted subpatches; and calculate, by using the machine learning model, at least one of the first score, the second score, and the third score based on a combination of the histograms of the color channels.

4. The computing apparatus of claim 1, wherein the first index further comprises at least one of a first class indicating that the cell membrane is negative or unstained, a second class indicating that the cell membrane is partially stained, or a third class indicating that the cell membrane is completely stained.

5. The computing apparatus of claim 1, wherein the processor is further configured to control the display apparatus to overlay and display the heatmap generated based on the score corresponding to the second index, on a screen on which at least a portion of the pathological slide image is output.

6. The computing apparatus of claim 1, wherein the processor is further configured to control the display apparatus to display an object adjusting a threshold value determining, based on a score corresponding to the second index, whether or not at least one of the components of the cell is stained, and to update and display the visualization result of the second index based on a user input adjusting the threshold value through the object, and to update the visualization result of the second index, the processor is further configured to control the display apparatus to update and display at least one of a tumor proportion score (TPS) and a combined positive score (CPS) corresponding to the pathological slide image, and statistics according to types of the cells included in the pathological slide image as the threshold value is adjusted.

7. The computing apparatus of claim 1, wherein an area corresponding to the one of the cells comprises an area within the outline corresponding to a cell membrane of the one of the cells, and wherein the processor is further configured to, based on the indicator being located on the area within the outline, control the display apparatus to display a separate window comprising information regarding the one of the cells, and the information regarding the one of the cells comprises at least one of a staining intensity of a cell membrane of the one of the cells, a staining intensity of the cytoplasm of the one of the cells, a type of the one of the cells, and the level of staining of the cell membrane of the one of the cells.

8. The computing apparatus of claim 1, wherein the processor is further configured to control the display apparatus to display an analysis result of an anti-cancer target or a prediction result of a treatment response based on the third index.

9. A method of analyzing a pathological slide image, the method comprising:

analyzing the pathological slide image to classify at least one of cells and tissues included in the pathological slide image into at least one type;

segmenting the pathological slide image into subpatches based on a result of the classification;

generating information regarding components of a cell included in each of the subpatches by analyzing the subpatches;

generating, by using a machine learning model, subcell information including a first index and a second index for at least one of the components determined based on information regarding the subpatches and the components, calculating a third index corresponding to a cell membrane specificity of the at least one of cells included in the pathological slide image based on the second index, wherein the cell membrane specificity indicates how much of a targeted object is present in a cell membrane of the cell;

controlling a display apparatus to display information regarding the third index of the at least one of cells and tissues;

controlling the display apparatus to display at least one of a visualization result of the second index for at least one of components of each of cells included in the pathological slide image and a visualization result of the first index for any one of the components;

controlling the display apparatus to display a graph indicating a distribution of scores corresponding to a staining intensity of at least one of a membrane, cytoplasm, and a cell nucleus of each of the cells included in the pathological slide image; and controlling the display apparatus to replace a heatmap generated based on a score corresponding to the second index with visualization results of components of each of the cells and display the visualization result, based on an enlargement magnification set according to a user input being a preset magnification or more, wherein the visualization results of the components of each of the cells comprise at least one of a first visualization element in which an outline corresponding to a cell membrane of each of the cells is displayed in a certain color and a second visualization element in which a figure generated based on a class corresponding to the first index being displayed at a central point of each of the cells.

10. The method of claim 9, wherein the first index comprises a class corresponding to a level of staining of the cell membrane of the cell, and the second index comprises at least one of a first score corresponding to a staining intensity of the cell membrane of the cell, a second score corresponding to a staining intensity of cytoplasm of the cell, and a third score corresponding to a staining intensity of a cell nucleus of the cell.

11. The method of claim 10, wherein the outputting comprises:

converting a format of the subpatches;

calculating a histogram of each of color channels for a cell membrane, cytoplasm, and the cell nucleus included in the converted subpatches; and calculating, by using the machine learning model, at least one of the first score, the second score, and the third score based on a combination of the histograms of the color channels.

12. The method of claim 9, wherein the first index further comprises at least one of a first class indicating that the cell membrane is negative or unstained, a second class indicating that the cell membrane is partially stained, or a third class indicating that the cell membrane is completely stained.

13. The method of claim 9, wherein the displaying comprises overlaying and displaying the heatmap generated based on the score corresponding to the second index, on a screen on which at least a portion of the pathological slide image is output.

14. The method of claim 9, wherein the displaying comprises:

displaying an object adjusting a threshold value determining whether or not at least one of the components of the cell is stained, based on a score corresponding to the second index; and updating and displaying the visualization result of the second index based on a user input adjusting the threshold value through the object, and the displaying the visualization result of the second index comprises updating and displaying at least one of a tumor proportion score (TPS) and a combined positive score (CPS) corresponding to the pathological slide image, and statistics according to types of the cells included in the pathological slide image as the threshold value is adjusted.

15. A non-transitory computer-readable recording medium having recorded thereon a program for causing a computer to execute the method of claim 9.

* * * * *